(12) United States Patent
Yamada

(10) Patent No.: US 6,786,690 B1
(45) Date of Patent: Sep. 7, 2004

(54) LOCKING FASTENER

(76) Inventor: Fusao Yamada, 3143-26, Irumagawa, Sayama-shi, Saitama 350-1305 (JP)

(*) Notice: Subject to any disclaimer, the term of this patent is extended or adjusted under 35 U.S.C. 154(b) by 39 days.

(21) Appl. No.: 10/276,377
(22) PCT Filed: Jun. 19, 2002
(86) PCT No.: PCT/JP02/06097
§ 371 (c)(1), (2), (4) Date: Nov. 15, 2002
(87) PCT Pub. No.: WO03/093691
PCT Pub. Date: Nov. 13, 2003

(51) Int. Cl.$^7$ ................................................. F16B 39/12
(52) U.S. Cl. ......................... 411/238; 411/433; 411/935
(58) Field of Search ................................. 411/237, 238, 411/353, 433, 935, 935.1

(56) References Cited

U.S. PATENT DOCUMENTS

| 732,590 | A | * | 6/1903 | Scholer | 411/238 |
| 2,301,634 | A | * | 11/1942 | Nicholay | 411/238 |
| 2,384,953 | A | * | 9/1945 | Miller | 411/237 |
| 2,449,846 | A | * | 9/1948 | Gilman | 411/237 |
| 6,609,867 | B2 | * | 8/2003 | Wakabayashi | 411/238 |

FOREIGN PATENT DOCUMENTS

| JP | U 55-112112 | 8/1980 |
| JP | U 57-184308 | 11/1982 |
| JP | A 5-202920 | 8/1993 |
| JP | U 6-32721 | 4/1994 |
| JP | A 9-280239 | 10/1997 |

* cited by examiner

Primary Examiner—Neill Wilson
(74) Attorney, Agent, or Firm—Oliff & Berridge, PLC

(57) ABSTRACT

In a fastener comprising a bolt (3), a nut (2), and a washer (1), a bolt through-hole (5) which is slightly larger than a nominal diameter of the bolt (3) is formed in a base portion (4) of the washer (1), a conical barrel member (6) whose diameter decreases toward an upward position in a bolt axial direction is formed around the bolt through-hole (5) so as to stand therefrom, a continuous slit for a notched circle is formed in the base portion (4) and the conical barrel member (6), the diameter of the conical barrel member (6) of such a washer (1) is decreased by the fastening of the nut (2) and the bolt (3), and the conical barrel member (6) is fitted into a conical hole portion (10) of the nut (2), thereby obtaining a state where the conical barrel member (6) of the washer (1) is bitten and sandwiched between the bolt (3) and the nut (2). The bolt (3) and the nut (2) are strongly integrated via two kinds of integration routes in the bolt axis orthogonal direction and the bolt axial direction, thereby rationally realizing a large locking effect.

20 Claims, 22 Drawing Sheets

(a)

(b)

(a)

(b)

(c)

(a)

(b)

(a)

(b)

(a)

(b)

(a)

(b)

LOCKING FASTENER

This application is a 371 of PCT/JP02/06097 filed Jun. 19, 2002.

TECHNICAL FIELD

The invention relates to a locking fastener which comprises a bolt, a washer, and a nut and certainly prevents looseness of the fastener by a simple structure.

BACKGROUND ART

Generally, as a fastener, a fastener comprising a bolt and a nut or a fastener comprising a bolt, a nut, and a washer is used. Naturally, it is desirable that the fastener has the washer to protect a member to be fastened. The most important portion which is coupled by the fastener is a coupling portion of an airplane, a train, or the like or a coupling portion of a building, a steel tower, a bridge of a freeway, or the like. A locking fastener is used, particularly, for such a portion which is subject to an influence of looseness due to vibration caused by running of vehicles or vibration caused by the wind or the like.

Many fasteners having a locking effect have been proposed. For example, in JP-A-9-79247, there has been disclosed a fastener constructed in a manner such that a seat surface of a washer is formed as a convex portion or a concave portion having an inclined surface, a back surface of a nut or a back surface of a head portion of a bolt is formed as a concave portion or a convex portion having an inclined surface corresponding to the convex portion or the concave portion of the washer, and a frictional force caused by compression is allowed to act on the inclined surfaces of the washer and the nut which are fitted to each other, thereby providing the locking effect.

According to the above fastener, in the case of forming the convex portion, a serious disadvantage such that a part of a screw portion of the nut is lost for providing the inclined surface is compensated by a frictional portion formed in such a part of the screw portion. However, it is difficult that the frictional force caused only in such a limited span resists a strong loosing force. In the case of forming the concave portion, a thickness for engaging the nut has to be added, so that a strange thick washer is obtained, a resistance force depends on the frictional force caused only in such a limited span in a manner similar to the case where the convex portion is formed, and it is difficult.

In addition to it, according to the above proposed fastener, it is difficult to expect that reliability of the washer endures, and a construction such that a pin for stopping rotation is provided for the washer so as to be projected therefrom for the purpose of preventing the washer from being rotated against the spiral engagement of the bolt and the nut has also been described. However, to form the rotation stopping pin onto the washer, a fitting portion for fitting the pin needs to be provided for the side of a plate to be fastened or the nut in correspondence to the rotation stopping pin formed on the washer. Thus, there is also a problem such that a structure becomes complicated and productivity and generality deteriorate. There is, eventually, unreasonableness such that the resistance force depends on a shearing force of the pin.

Further, since the locking results from the integrated structure of the nut and the bolt, even if the washer and the nut are completely integrated, looseness which is exerted to the bolt as a separate member cannot be blocked and the proposed fastener has a large defect.

In JP-A-11-6516, there has been proposed a double nut having a locking effect and comprising: a first nut in which a tapered outer peripheral surface whose diameter decreases toward an upward position in an axial hole direction is formed around a screw hole and a convex portion whose outer peripheral surface is slightly decentered from the screw hole is formed; and a second nut into which the convex portion of the first nut is fitted, for which a concave portion having an inner peripheral surface that is concentric with the screw hole is provided, and which is attached later.

According to the double nut, a resin or a soft metal is coated onto the side of the eccentric direction of the first nut, the convex portion of the first nut is fitted into the concave portion of the second nut, and when the first nut is fastened by the second nut, the decentered convex portion of the first nut is fitted into the concave portion of the second nut that is concentric with the screw hole, thereby providing wedge-like action and accomplishing the locking effect.

That is, when the concave portion of the second nut which is attached later is fitted to the convex portion of the first nut which is attached ahead and a female screw of the second nut and a screw portion of the bolt are screwed, since the convex portion of the first nut is decentered, while the first nut presses the bolt from the eccentric side, a fastening force acts, and the position of the first nut is slightly deviated to the other side in the eccentric direction, and while the second nut presses the bolt from the other side in the eccentric direction, a fastening force acts.

In upper and lower opposite positions of a fitted laminate of the first and second nuts, strong pressing forces act from the directions which cross perpendicularly to a bolt axis, and the locking is performed by a frictional force of the tapered surfaces of the first and second nuts.

According to the proposed fastener, since the strong pressing forces of the disadvantageous shearing forces are applied to the bolt axis in the upper and lower positions from the opposite orthogonal directions, a burden on the bolt is heavy.

According to the double nut, since the two nuts are overlappingly used, there is a damage to thread ridges, it cannot endure repetitive use, and it becomes expensive.

Further, since a space enough for the convex portion of the first nut is necessary, there is also restriction of use such that the double nut cannot be used in a narrow space where the first nut and the convex portion cannot be allowed.

In JP-A-10-306819, as shown in FIG. 22, there has been proposed a locking structure comprising: a ring-shaped locking member 20 in which an outer surface is formed in a tapered shape whose diameter decreases upward in a bolt axial direction, a female screw 23 which is continuous with a female screw portion 11 of a nut is formed on an inner peripheral surface, and a notched portion 22 in that a part of a circumference is cut away in a bolt axial direction; and a nut 2 with a tapered concave portion 30a having a tapered inner peripheral surface into which the ring member 20 is fitted.

When a bolt 3 and the nut 2 are fastened, a diameter of the ring-shaped locking member 20 decreases and the locking member 20 becomes a filling coupling member between the bolt 3 and the nut 2 and enters the tapered concave portion 30a of the nut 2.

Stresses in the axis orthogonal directions which repulse the compression of the locking member 20 and are directed toward both of the bolt 3 and the nut 2 act and a fastening force increases, thereby preventing the looseness of the screw.

According to the proposed fastener, although a part of the screw of the nut is sacrificed in a manner similar to the foregoing JP-A-9-79247, it differs therefrom with respect to a point that a filling coupling member (locking member 20) whose diameter can be freely decreased exists in the sacrificial portion.

The locking effect relies eventually on the frictional force caused by the contact of the tapered outer peripheral surface of the locking member 20 with the tapered concave portion 30a of the nut 2, and the locking member 20 is integrated with the bolt 3 at the back surface (the integration effect cannot be expected with respect to the spiral moving direction because of the engagement of the screw). However, since there is a limitation at the contact surface which is provided only in such a limited span, it is necessary that the tapered concave portion 30a is formed in a wide diameter portion 30 obtained by increasing a diameter of an upper portion of the nut 2. Since the nut 2 has a special shape, a problem of an increase in manufacturing costs is caused. In a manner similar to the double nut, there is also restriction of use such that the nut 2 having the special shape cannot be used in a space where the wide diameter portion 30 cannot be allowed.

The locking results from the integrated structure of the nut and the bolt as mentioned above, and according to the proposed fastener, such an integrated structure is obtained only by the rebound forces against the compression of the action in the bolt axis orthogonal direction in the tapered concave portion 30a of the nut 2. However, the integrated effective portion which can be caused only in the small span is too weak to perform the locking and it is not effective.

DISCLOSURE OF INVENTION

According to the first invention, there is provided a locking fastener comprising:

a bolt;

a washer in which a base portion has a bolt through-hole that is slightly larger than a nominal diameter of the bolt, a conical barrel member whose diameter decreases toward an upward position in a bolt axial direction is formed around the bolt through-hole so as to stand therefrom, and a continuous slit for a notched circle is formed in the base portion and the conical barrel member; and a nut in which a conical hole portion is opened over a female screw portion that is screwed with a screw portion of the bolt, the conical hole portion being constructed in a manner such that a diameter of an inner periphery of a half portion which does not face the washer is set to be smaller than that of an outer periphery of a front edge portion of the conical barrel member of the washer, a diameter of an opening of a half portion on the side which faces the washer is set to be smaller than that of an outer periphery of a root portion of the conical barrel member of the washer, a height is slightly higher than that of the conical barrel member of the washer, and a tapered surface of the same inclination angle as that of the conical barrel member of the washer is formed.

According to the first invention, when a plate to be fastened is fastened, a fastening force of the nut is applied to the slit for the notched circle, a gap of the slit for the notched circle decreases, the diameter of the conical barrel member of the washer decreases, the conical barrel member of the washer is interposed like a clogging material between the conical hole portion of the nut and the bolt, a state where the conical barrel member of the washer is bitten and sandwiched between the nut and the bolt is obtained, and the nut and the washer are integrated by a rebound stress with respect to the bolt axis orthogonal direction in a manner similar to the case of JP-A-10-306819 mentioned above.

However, the invention remarkably differs from it with respect to the following points. That is, since the conical barrel member is integrated with the base portion, the conical barrel member is strongly pulled in the bolt axial direction by a force which presses the base portion that is made operative by the fastening of the nut onto the surface to be fastened. In this instance, however, the conical barrel member whose inner surface has been come into engagement with thread ridges of the bolt allows a shearing force to act in the direction of tearing the thread ridges of the bolt. Such an extremely strong shearing force is a unique frictional force regarding the bolt axial direction which acts on both of the washer (the conical barrel member) and the bolt regarding the whole circumference in the bolt axial direction. Thus, the pressure of the nut onto the base portion mentioned above is subjected to a resistance by a strong spring force, and the nut and the bolt are integrated via such a resistance force.

Eventually, the nut which presses the base portion of the washer is integrated with the bolt even if it is subjected to the shearing force which acts on the thread ridges in the bolt axial direction via the conical barrel member of the washer.

The fastener of the invention is strongly integrated via two kinds of integration routes in the bolt axis orthogonal direction and the bolt axial direction, thereby rationally realizing a large locking effect.

The conical barrel member of the washer in the state where it is bitten and sandwiched between the bolt and the nut provides wedge-like action, a force which allows the screw portion of the bolt to be come into pressure contact is applied from the whole circumference to the female screw portion of the nut which is in spiral engagement in a front edge portion in the bolt axial direction rather than the washer, and the integration of the nut and the bolt is further enhanced, thereby increasing the locking effect.

If a hexagon nut is used as a fastener, there are problems such that the fastening surface of a plate to be fastened is scratched by corner portions of the hexagon nut, the fastening surface of the hexagon nut is not uniformly come into contact with the fastening surface of the plate to be fastened, a compressing force obtained by the fastening of the bolt and the nut is not uniformly applied symmetrically with the bolt axis, and the like. According to the invention, however, since the washer is interposed between the bolt and the nut, the effects which are ordinarily provided by the washer such that the fastening surface of the plate to be fastened is protected, the compressing force by the fastening of the bolt and the nut is uniformly applied symmetrically with the bolt axis, and the like are also naturally obtained.

As a shape of the slit for the notched circle of the washer, an arbitrary shape can be set so long as the diameter decreases. A shape which is inclined to the bolt axis or a straight shape can be set. Another V-character shape or a waveform shape can be set. A slit for a notched circle having any of various shapes can be formed. The shape of the slit for the notched circle is not limited.

In the second invention, as a construction of the locking fastener according to the first invention, a part of the conical barrel member of the washer is constructed as a thick portion which is slightly decentered from a center of a circle of the bolt through-hole.

In the second invention, in association with the spiral engagement of the bolt and the nut, when the conical barrel member of the washer whose diameter has been decreased is fitted into the conical hole portion of the nut, the thick portion of the conical barrel member which is slightly decentered presses the bolt from the radial direction. A frictional force acting on both of the washer (the conical barrel member) and the bolt increases owing to the wedge-like effect of the washer (the thick portion of the conical barrel member). The pressure of the nut onto the base portion is subject to the strong resistance of the washer. The integration of the nut and the bolt is enhanced via such a resistance force. The large locking effect is obtained.

Further, since the bolt which is pressed from the radial direction in the thick portion of the conical barrel member of the washer and enters a state where it is slightly inclined is pressed by the nut from the radial direction opposite to the thick portion, pressing forces are applied to the bolt from the opposite radial directions in upper and lower positions in the bolt axial direction. The locking effect is improved.

In the third invention, as a construction of the locking fastener according to the first or second invention, the height of the conical barrel member of the washer is set to a height such that a female screw of at least 2.5 leads or more can be formed on an inner peripheral surface of the conical barrel member of the washer at the same pitch as that of the screw portion of the bolt.

If the height of the conical barrel member of the washer is set to the height such that the female screw of at least 2.5 leads or more can be formed on the inner peripheral surface of the conical barrel member of the washer at the same pitch as that of the screw portion of the bolt, the conical barrel member of the washer is certainly bitten and sandwiched between the bolt and the nut and the foregoing force acts certainly on the washer (the conical barrel member) in the bitten and sandwiched state. Therefore, the integration of the bolt and the nut which provides the large locking effect is assured.

In the fourth invention, as a construction of the locking fastener according to the first, second, or third invention, in a combination of the washer and the bolt, one of them is made of a soft material which is softer than that of the other.

In the fourth invention, for example, if the washer is made of the soft material which is softer than that of the bolt, the inner surface of the conical barrel member of the washer enters a state where it is certainly in engagement with the thread ridges of the bolt by the fastening of the nut. Since the foregoing various forces act on the washer (the conical barrel member) in the state where it is in engagement with the thread ridges of the bolt, the nut and the bolt are strongly integrated.

If the bolt is made of the soft material which is softer than that of the washer, the screw portion of the bolt is pressed by the inner surface of the conical barrel member of the washer, the bolt and the washer (the conical barrel member) are bonded with a pressure, and the bolt and the nut are strongly integrated via the washer.

In the fifth invention, as a construction of the locking fastener according to the first, second, third, or fourth invention, the slit for the notched circle of the washer is formed so as to be inclined in the direction opposite to the spiral direction of the screw portion of the bolt.

In the fifth invention, although a fastening torque is also spirally applied to the conical barrel member of the washer by the fastening of the nut, if the slit for the notched circle of the washer is inclined, the fastening torque which is spirally applied is uniformly applied to the slit for the notched circle. A diameter of the washer (the conical barrel member) decreases. The washer is smoothly fitted into the conical hole portion of the nut. The pressure of the nut onto the base portion can be uniformly applied to the whole circumference of the bolt axis symmetrically with the bolt axis, thereby realizing the strong integration of the nut and the bolt.

If the slit for the notched circle of the washer is inclined in the direction opposite to the spiral direction of the screw portion of the bolt, an end portion of the slit for the notched circle on the side of the fastening direction of the nut becomes an edge shape to the nut by the strong fastening force of the nut. The edge-shaped end portion of the slit for the notched circle enters a state where it is hooked to the fastening surface of the nut which presses the base portion of the washer. If the nut is intended to be rotated in the loosing direction by a vibration or the like, the portion hooked in the edge shape becomes a stopper, blocks the rotation in the loosing direction of the nut, and maintains the integration of the bolt and the nut, thereby preventing the nut from being loosed.

In the sixth invention, as a construction of the locking fastener according to the first, second, third, or fourth invention, the slit for the notched circle of the washer is formed so as to be inclined in the same direction as the spiral direction of the screw portion of the bolt.

In the sixth invention, in a manner similar to the fifth invention, the spiral fastening torque in association with the progress of the spiral engagement of the bolt and the nut is uniformly applied to the whole inclined slit for the notched circle of the washer and the diameter of the whole conical barrel member of the washer decreases uniformly. Therefore, the foregoing force acts uniformly on the whole circumference of the periphery of the bolt axis symmetrically with the bolt axis. The strong integration of the bolt and the nut can be realized via the washer.

In the seventh invention, as a construction of the locking fastener according to the first, second, third, or fourth invention, the slit for the notched circle of the washer is formed in the same direction as the bolt axial direction.

In the seventh invention, since the conical barrel member of the washer enters the state where it is strongly pulled in the bolt axial direction by the fastening force of the nut, an end portion of the straight slit for the notched circle formed in the same direction as the bolt axial direction becomes a sharp edge shape and enters the state where it is hooked to the fastening surface of the nut. The portion hooked in the edge shape functions as a stopper and blocks the rotation in the loosing direction of the nut.

In the eighth invention, as a construction of the locking fastener according to the first, second, third, fourth, fifth, sixth, or seventh invention, a concave portion of a diameter which is slightly larger than that of a large diameter portion of the conical barrel member is provided for a center portion of the base portion of the washer.

In the eighth invention, since the concave portion is provided for the center portion of the base portion of the washer, the pressure of the nut onto the base portion acts on the inner portion of the concave portion and the base portion of the washer serving as a fastening surface remaining around the concave portion is uniformly come into contact with the surface of the plate to be fastened. Therefore, the pressure of the nut onto the base portion acts uniformly on the whole circumference of the base portion of the washer symmetrically with the bolt axis, thereby enhancing the integration of the nut and the bolt via the washer which provides the locking effect.

Since the concave portion is provided for the base portion of the washer, this is similar to that a plate thickness of the base portion which is closely come into contact with the periphery of the screw portion of the bolt becomes thin. The fastening torque which increases larger than the plate thickness of the base portion which is in close contact with the periphery of the screw portion of the bolt can be reduced. Particularly, in a fastener of a large standard value, since the fastening torque is small, the fastening work can be easily performed.

In the ninth invention, as a construction of the locking fastener according to the first, second, third, fourth, fifth, sixth, or seventh invention, at least one notched portion obtained by cutting out the base portion in the radial direction is provided for the base portion of the washer.

In the ninth invention, since the notched portion is provided for the base portion of the washer and a degree of freedom of deformation of the base portion of the washer is increased by the notched portion, the fastening torque can be reduced and the fastening work can be easily performed.

In the tenth invention, as a construction of the locking fastener according to the second, third, fourth, fifth, sixth, seventh, or ninth invention, at least one notched portion obtained by cutting out the base portion in the radial direction is provided for the base portion of the washer formed continuously with the thickest portion of the eccentric conical member of the washer.

In the tenth invention, since the notched portion in the radial direction is provided for the base portion communicated with the thick portion of the eccentric conical barrel member of the washer, particularly, a degree of freedom of deformation of the portion which requires a force for rotation is increased, the fastening torque can be reduced, and the fastening work can be easily performed.

In the eleventh invention, as a construction of the locking fastener according to the first, third, fourth, fifth, sixth, seventh, or ninth invention, at least one vertical groove portion is provided in the axial direction of the conical barrel member of the washer.

In the eleventh invention, since at least one vertical groove portion is provided for the conical barrel member, a degree of freedom of deformation of the conical barrel member increases and the conical barrel member is easily bent and deformed in the diameter-decreasing direction, the fastening torque of the nut is reduced and the fastening work can be easily performed.

Since the degree of freedom of deformation of the conical barrel member increases by the vertical groove portions provided for the conical barrel member of the washer, the rebound stress of the washer (the conical barrel member) in the bolt axis orthogonal direction is not attenuated, but the strong integration of the bolt and the nut via the washer is maintained, and the large locking effect is obtained.

As a shape of the vertical groove portion, any shape can be set so long as the degree of freedom of deformation of the conical barrel member of the washer is increased. The vertical groove portion can be formed in each of various shapes such that it is formed in a straight shape for the axial direction, it is formed so as to be inclined at the same angle as that of the slit for the notched circle, it is formed so as to have a side surface in a V-character shape, it is formed in a waveform shape, and the like.

In the twelfth invention, as a construction of the locking fastener according to the second, third, fourth, fifth, sixth, seventh, or tenth invention, at least one vertical groove portion is provided in the axial direction of the conical barrel member of the washer while excluding the thickest portion of the eccentric conical barrel member of the washer.

In the twelfth invention, since the vertical groove portion is provided for the conical barrel member of the washer while excluding the thickest portion of the conical barrel member of the washer having the thick portion which is slightly decentered, a pressing force by the thick portion of the conical barrel member can be effectively applied to the bolt. Since the degree of freedom of deformation of the washer increases by the vertical groove portion, the fastening torque can be reduced and the fastening work can be easily performed.

In the thirteenth invention, as a construction of the locking fastener according to the first, second, third, fourth, fifth, sixth, seventh, eighth, ninth, tenth, eleventh, or twelfth invention, the inclination angle of the conical barrel member of the washer is set to almost 10°.

In the thirteenth invention, if the inclination angle of the conical barrel member of the washer is set to almost 10°, a height of conical barrel member is equal to a height such that a female screw of at least 2.5 leads or more can be formed on the inner peripheral surface of the conical barrel member at the same pitch as that of the screw portion of the bolt. Therefore, it is set to the height such that the conical barrel member of the washer is certainly bitten and sandwiched between the bolt and the nut. The foregoing force is allowed to act on the washer. A large locking effect can be realized by the strong integration of the bolt and the nut via the washer.

In the fourteenth invention, as a construction of the locking fastener according to the fifth or sixth invention, the inclination angle of the slit for the notched circle of the washer to the bolt axis is set to an angle within a range from almost 20° to 25°.

In the fourteenth invention, if the inclination angle of the slit for the notched circle of the washer to the bolt axis is set to an angle within the range from almost 20° to 25°, the end portion of the slit for the notched circle is uniformly come into contact with the screw portion of the bolt with a predetermined phase difference. The diameter of the conical barrel member of the washer can be smoothly reduced by the fastening torque which is spirally applied.

In the fifteenth invention, as a construction of the locking fastener according to the first, second, third, fourth, fifth, sixth, seventh, eighth, ninth, tenth, eleventh, twelfth, thirteenth, or fourteenth invention, a width of slit for the notched circle of the washer is set to a width having a gap in a state where the bolt and the nut have been fully fastened.

In the fifteenth invention, since the width of slit for the notched circle is set to the width such that there is a gap between the edge surfaces of the slit for the notched circle in the state where the nut has been fully fastened, even in the state where the nut has been fully fastened, a strong spring force of the washer in the state where it is bitten and sandwiched between the nut and the bolt is maintained, thereby realizing the strong integration of the nut and the bolt.

In the sixteenth invention, as a construction of the locking fastener according to the first, second, third, fourth, fifth, sixth, seventh, eighth, ninth, tenth, eleventh, twelfth, thirteenth, fourteenth, or fifteenth invention, a screw adapted to be come into engagement with the screw portion of the bolt is formed on the inner peripheral surface of the conical barrel member of the washer.

In the sixteenth invention, since the screw is formed on the inner peripheral surface of the conical barrel member of the washer, the conical barrel member is certainly fitted to the screw portion of the bolt, thereby certainly effecting a frictional force which acts on both of the washer and the bolt and strongly integrating the bolt and the nut.

In the seventeenth invention, as a construction of the locking fastener according to the sixteenth invention, a female screw of the same pitch as that of the screw portion of the bolt is formed on the inner peripheral surface of the conical barrel member of the washer.

In the seventeenth invention, since the female screw of the same pitch as that of the screw portion of the bolt is formed on the inner peripheral surface of the conical barrel member of the washer, in association with the fastening of the bolt and the nut, the conical barrel member of the washer is screwed with the screw portion of the bolt, its diameter is smoothly reduced, and the conical barrel member is fitted into the conical hole of the nut, thereby providing the large locking effect owing to the strong integration of the bolt and the nut via the washer.

In the eighteenth invention, as a construction of the locking fastener according to the sixteenth invention, a screw of a pitch smaller than that of the screw portion of the bolt is formed on the inner peripheral surface of the conical barrel member of the washer.

In the eighteenth invention, in association with the fastening of the bolt and the nut, only edge portions of the screw portion of the bolt enters a state where they are spirally come into engagement with the screw formed on the inner peripheral surface of the conical barrel member of the washer. The fastener can be easily loosened by using a tool such as a spanner or the like. An inspecting work which is executed by removing the fastener can be easily performed.

In the nineteenth invention, as a construction of the locking fastener according to the first, second, third, fourth, fifth, sixth, seventh, eighth, ninth, tenth, eleventh, twelfth, thirteenth, fourteenth, fifteenth, sixteenth, seventeenth, or eighteenth invention, the washer or the nut is made of a synthetic resin.

In the nineteenth invention, a fastener made of a synthetic resin which provides a large locking effect can be used in accordance with use object or use situation as in the case where it is used at a place of severe corrosion, or the like.

In the twentieth invention, as a construction of the locking fastener according to the nineteenth invention, a plurality of projecting portions which project inwardly are formed on the inner peripheral surface of the conical barrel member of the washer in the vertical direction.

In the twentieth invention, since a plurality of projecting portions which project inwardly in the vertical direction are formed on the inner peripheral surface of the conical barrel member of the washer made of the synthetic resin, when the diameter of the conical barrel member of the washer is decreased and the conical barrel member enters the conical hole portion of the nut, the projecting portions of the conical barrel member of the washer are strongly come into contact with the screw portion of the bolt and enter a state where they certainly bite and sandwich the conical barrel member of the washer between the bolt and the nut. Therefore, the foregoing force acts certainly on the washer made of the synthetic resin, thereby realizing the large locking effect owing to the strong integration of the bolt and the nut.

BEST MODE FOR CARRYING OUT THE INVENTION

An embodiment of the invention will be described hereinbelow with reference to the drawings.

First, a locking fastener shown in FIGS. 1 to 6 will be explained as a first embodiment.

Figure 1:
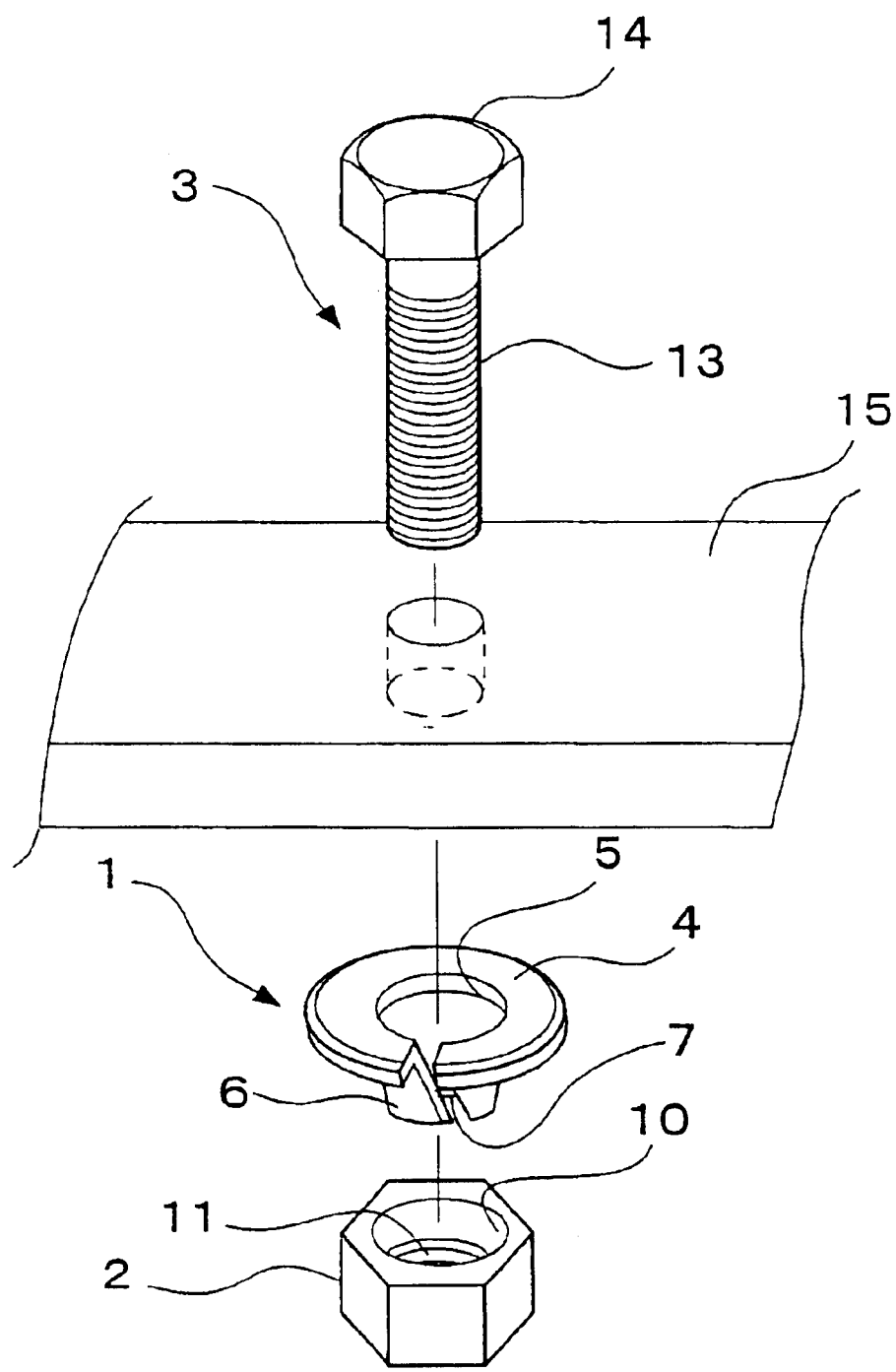
FIG. 1 is an exploded perspective view of a bolt, a washer, and a nut showing a locking fastener according to the invention.

As shown in FIG. 1, the locking fastener comprises a washer 1, the nut 2, and the bolt 3. The washer 1, nut 2, and bolt 3 are mutually and spirally assembled and the bolt 3 and the nut 2 are strongly integrated via the washer 1, thereby realizing a large locking effect.

Figure 2:
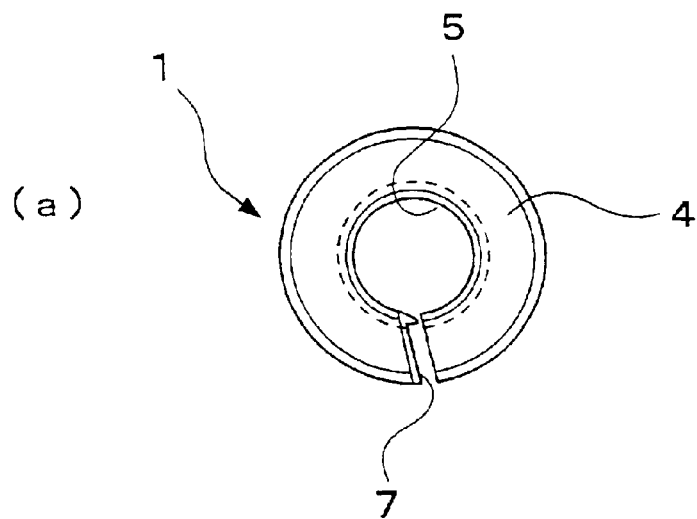
FIG. 2 shows the first embodiment of the washer of the invention, in which (a) a plan view, (b) a side elevational view, (c) a vertical sectional view, and (d) a bottom view.
Figure 2:
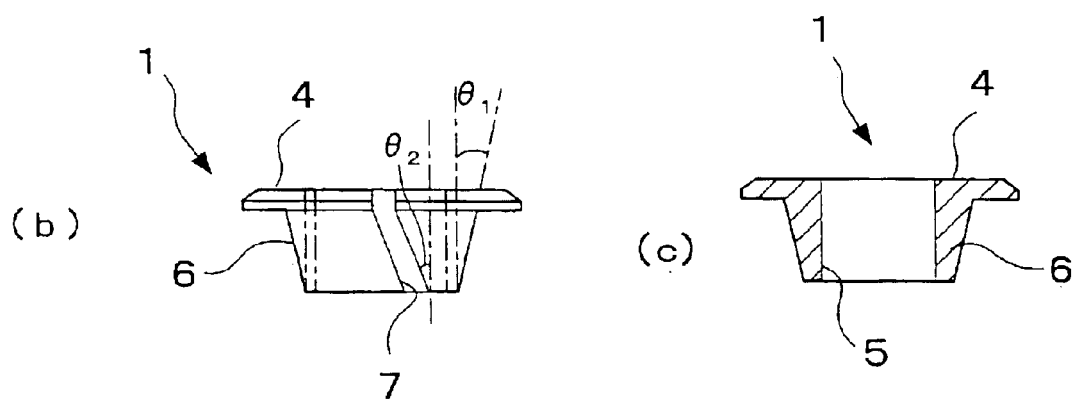
Figure 2:
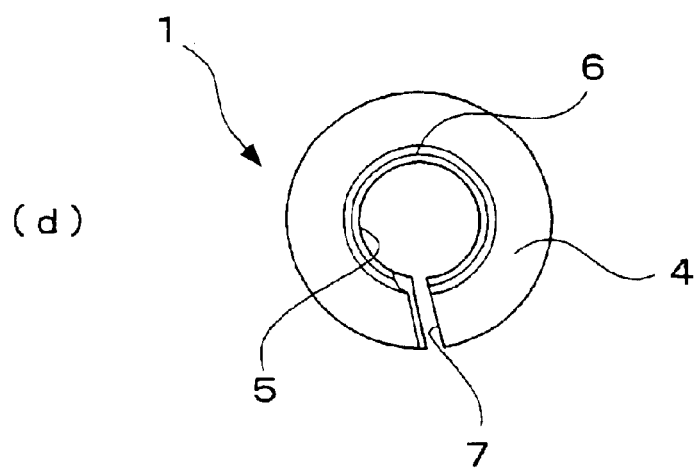

As shown in FIGS. 1 and 2, at a center of a base portion 4 in a circular flat plate shape, the washer 1 has a bolt through-hole 5 through which a screw portion 13 of the bolt 3 is pierced and which is slightly larger than a nominal diameter of the screw portion 13. A conical barrel member 6 whose diameter decreases in a front edge direction of a bolt axis is formed around the bolt through-hole 5 so as to stand therefrom.

In the embodiment, a slit 7 for a notched circle which is inclined in the direction opposite to the spiral direction of the screw portion 13 of the bolt 3 is cut out in the base portion 4 and the conical barrel member 6, respectively.

In the embodiment, an inclination angle θ1 of the conical barrel member 6 is set to almost 10° and an inclination angle θ2 of the slit 7 for the notched circle to the axial direction of the bolt 3 is set to an angle within a range from almost 20° to 25°.

Assuming that the inclination angle θ1 of the conical barrel member 6 is equal to almost 10°, a height of the conical barrel member 6 is set to a height such that a female screw of 2.5 leads or more can be formed on an inner peripheral surface of the conical barrel member 6 at the same pitch as that of the screw portion 13 of the bolt 3.

If the inclination angle θ2 of the slit 7 for the notched circle to the bolt axial direction is set to the angle within the range from almost 20° to 25°, the slit 7 for the notched circle is come into contact with each thread ridge of the screw portion 13 of the bolt 3 with a predetermined phase difference.

The slit 7 for the notched circle can be formed in a straight shape in the bolt axial direction. In the case of inclining it to the bolt axial direction, the inclination angle is not limited to the angle within the range from almost 20° to 25°.

Figure 3:
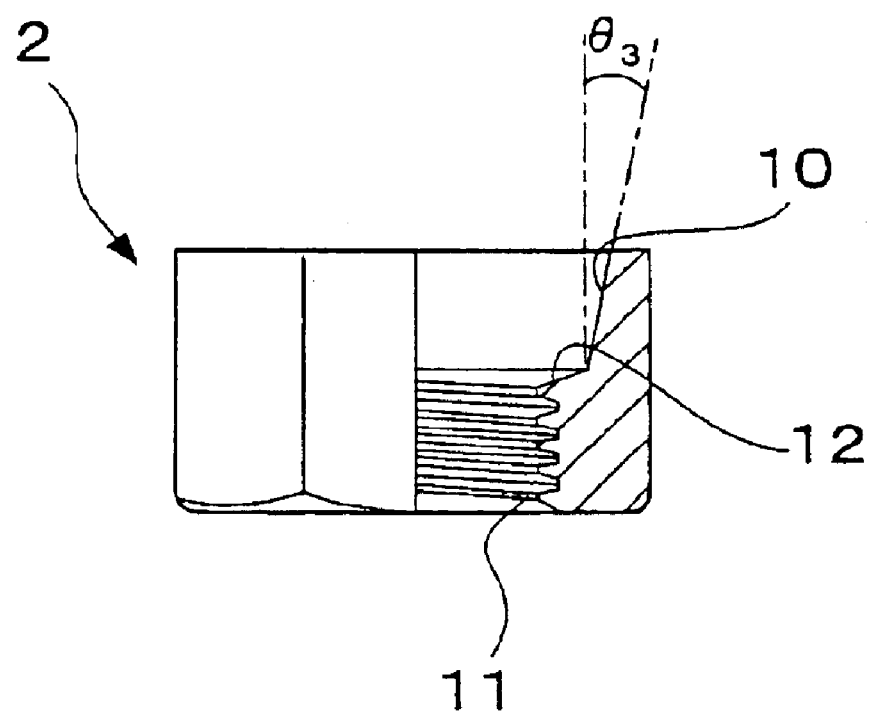
FIG. 3 shows the first embodiment of the nut of the invention and is a semi vertical sectional view.

As shown in FIG. 3, a conical hole portion 10 adapted to fit the conical barrel member 6 of the washer 1 is formed over the female screw portion 11 which is screwed with the screw portion 13 of the bolt 3. An inclination angle θ3 of the conical hole portion 10 is set to almost 10°, which is the same as the inclination angle θ1 of the conical barrel member 6. An inner flange-shaped jaggy portion 12 is formed between the female screw portion 11 and the conical hole portion 10.

As for the conical hole portion 10, a diameter of an inner periphery of a half portion which does not face the washer 1 is set to be smaller than that of an outer periphery of a front edge portion of the conical barrel member 6, and a diameter of an opening of a half portion on the side which faces the washer 1 is set to be smaller than that of an outer periphery of a root portion of the conical barrel member 6.

Figure 4:
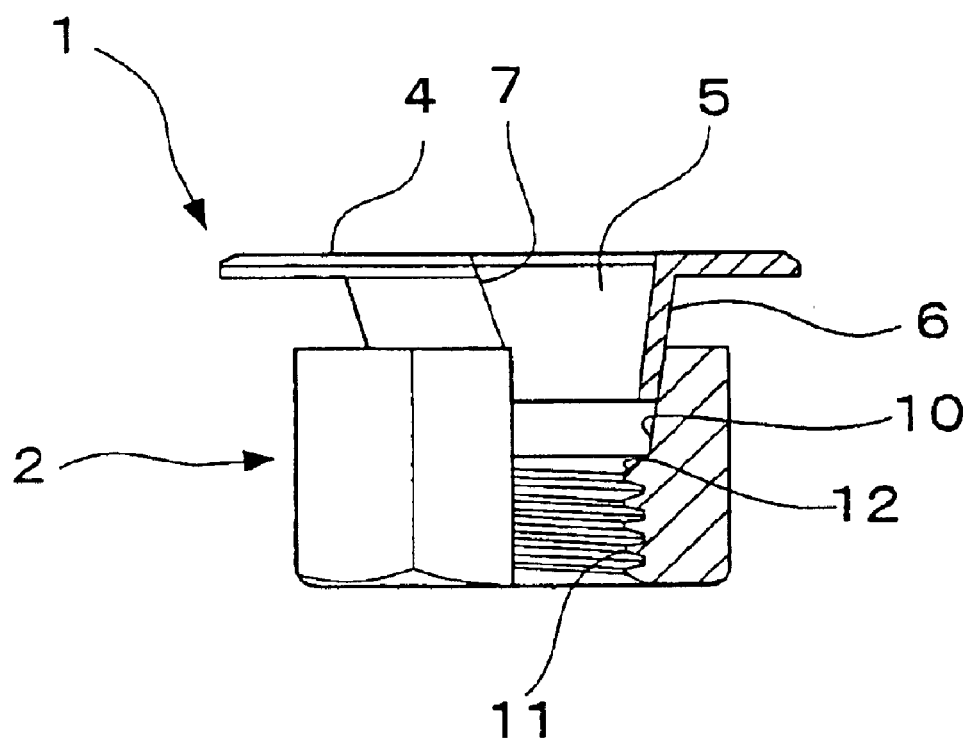
FIG. 4 is a semi vertical sectional view showing a state where the washer and the nut in FIGS. 2 and 3 have been assembled.

Therefore, as shown in FIG. 4, when the conical barrel member 6 of the washer 1 is inserted into the conical hole portion 10 of the nut 2, only the front edge portion of the conical barrel member 6 enters the conical hole portion 10 and becomes a state where the washer 1 is projected from the nut 2.

Figure 5:
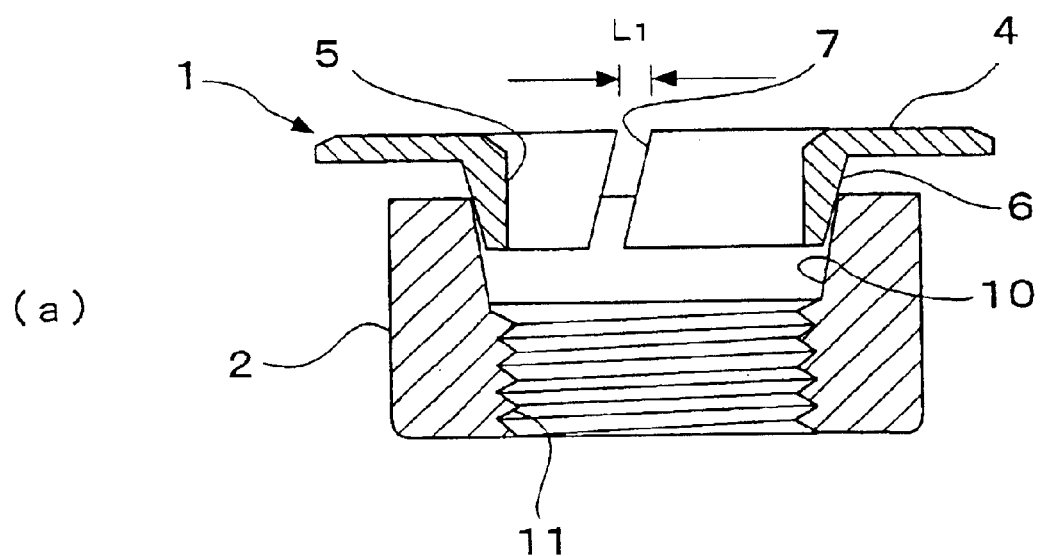
FIG. 5(a) is a vertical sectional view showing a state of the washer and the nut before fastening.
FIG. 5(b) is a vertical sectional view showing a state of the washer and the nut after the fastening.
Figure 5:
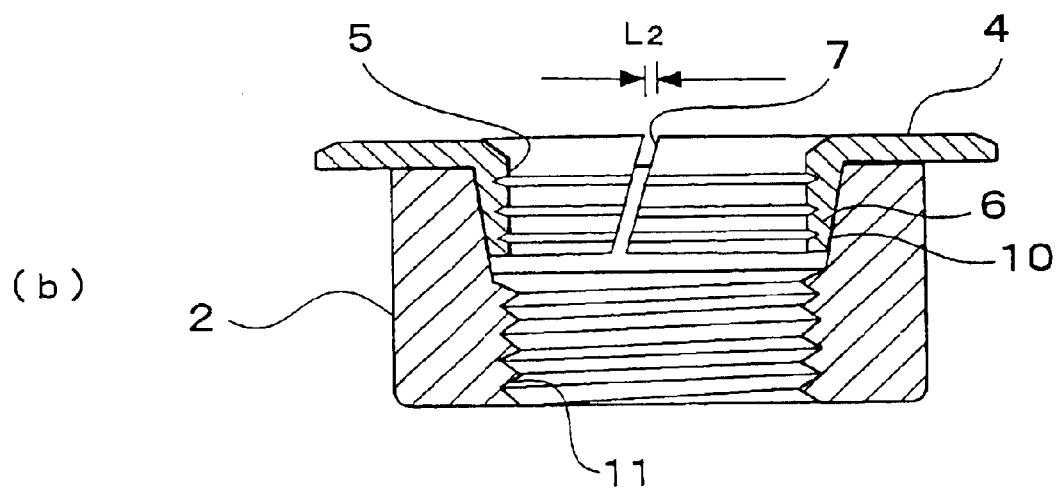
Figure 6:
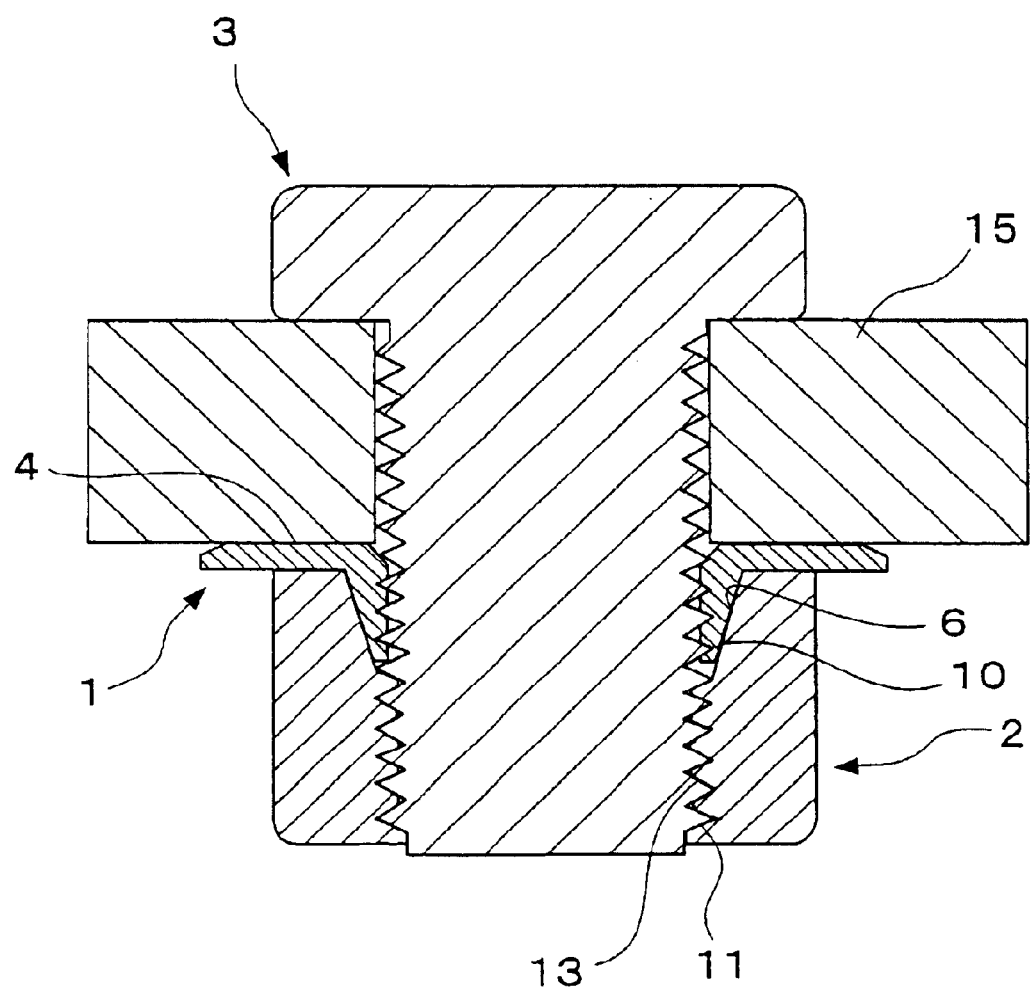
FIG. 6 is a vertical sectional view showing a state where a plate to be fastened has been fastened by the fastener shown in FIG. 1.

As shown in FIGS. 5 and 6, when a plate 15 to be fastened is bitten and sandwiched between the washer 1 and the bolt 3, the screw portion 13 and the female screw portion 11 are screwed, and a fastening force of the nut 2 is allowed to act, a spiral fastening force according to a lead angle of the female screw portion 11 of the nut 2 is uniformly applied to the inclined slit 7 for the notched circle.

As shown in FIG. 5(b), the whole slit 7 for the notched circle initially having a width L1 decreases uniformly to a width L2 and the diameter of the whole conical barrel member 6 decreases uniformly. In association with the fastening of the nut 2, the conical barrel member 6 is smoothly fitted into the conical hole portion 10.

The width L1 of the slit 7 for the notched circle is set to about 3 mm in the embodiment. It is sufficient that the width L1 of the slit 7 for the notched circle is set to a value such that the width L2 of the slit 7 for the notched circle is has a gap of about 0.5 to 1 mm in a state where the nut 2 has been fully fastened.

If the washer 1 is made of a soft material which is softer than that of the bolt 3, in association with the fastening of the nut 2, the front edge portions of the screw portion 13 bite the inner peripheral surface of the conical barrel member 6. In a state where the inner peripheral surface of the conical barrel member 6 has been shaved, almost the whole conical barrel member 6 is fitted into the conical hole portion 10 of the nut 2.

That is, as shown in FIG. 6, the conical barrel member 6 enters a state where it is bitten and sandwiched like a clogging material between the nut 2 and the bolt 3.

Figure 7:
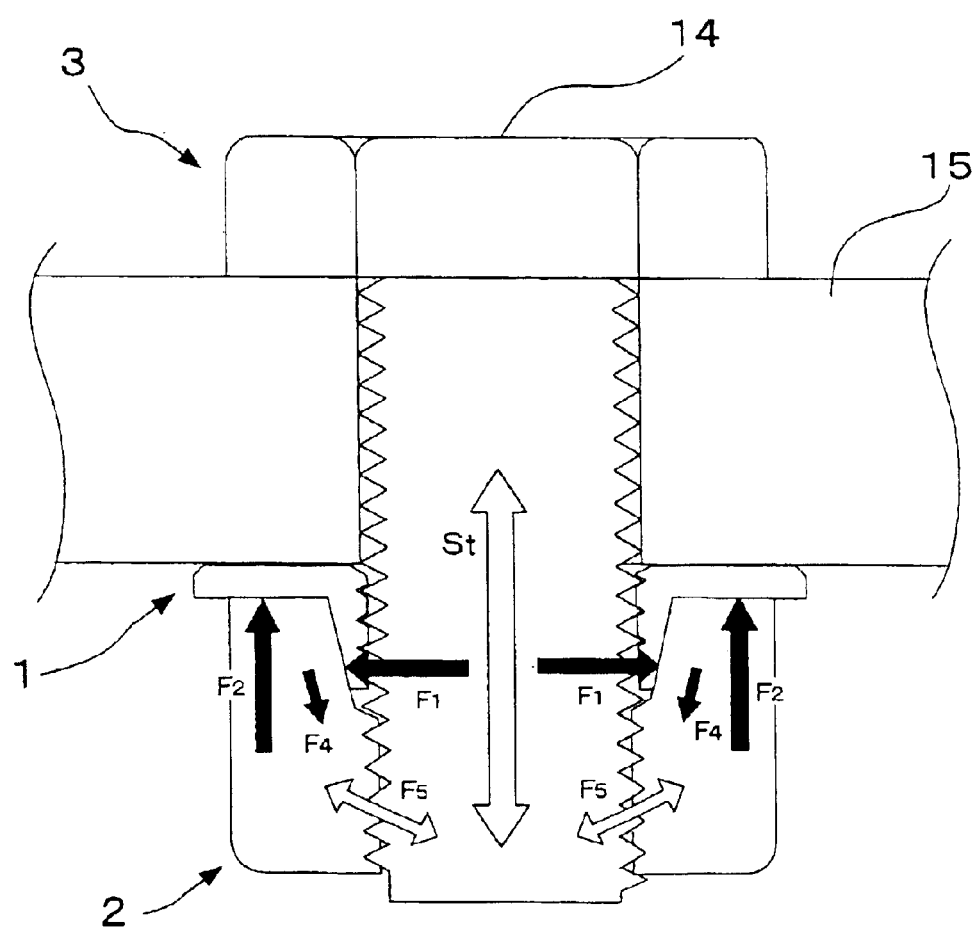
FIG. 7 is an explanatory diagram for explaining the acting direction of forces which are applied to the fastener by fastening.

FIG. 7 is a diagram for explaining directions of the forces which act among the washer 1, the nut 2, and the bolt 3. Black arrows in the diagram indicate the directions of the forces which provide the locking effect by the washer 1 and white arrows in the diagram indicate the directions of the forces which are applied to the bolt 3 and the nut 2.

As shown in FIG. 7, first, the nut 2 and the washer 1 are integrated by a rebound stress (arrow F1) with respect to the bolt axis orthogonal direction of the washer 1 in the state where it has been bitten and sandwiched between the nut 2 and the bolt 3.

Subsequently, the conical barrel member 6 is strongly pulled in the bolt axial direction (arrow St) by a force which presses the base portion 4 onto the surface to be fastened by the fastening of the nut 2. In this instance, a shearing force in the direction of tearing the thread ridges of the bolt 3 acts on the conical barrel member 6 whose inner surface has been bitten to the thread ridges of the bolt 3. This extremely strong shearing force is a unique frictional force regarding the bolt axial direction which acts on both of the washer 1 regarding the whole circumference in the bolt axial direction and the bolt 3. Thus, a pressing force (arrow F2) of the nut 2 onto the base portion 4 receives resistance by a strong spring force of the washer 1, and the nut 2 and the bolt 3 are integrated via such a resistance force.

Thus, the bolt 3 and the nut 2 are strongly integrated via the washer 1 through two kinds of integration routes in the bolt axis orthogonal direction (arrow R1) and the bolt axial direction (arrow F2), thereby rationally realizing the large locking effect.

The conical barrel member 6 of the washer 1 which has been bitten and sandwiched between the bolt 3 and the nut 2 performs wedge-like action. A force (arrow F4) for allowing the screw portion 13 of the bolt to be come into pressure contact with the female screw portion 11 of the nut 2 screwed in the front edge portion in the bolt axial direction rather than the washer 1 from the whole circumference is applied to the female screw portion 11. A frictional force (arrow F5) which is applied to the thread ridges of the bolt 3 screwed with the nut 2 is enhanced. The integration of the nut 2 and the bolt 3 is made further strong, thereby rationally realizing the large locking effect against every vibration such as pitch, rolling, vibration in the oblique direction, or the like.

Figure 8:
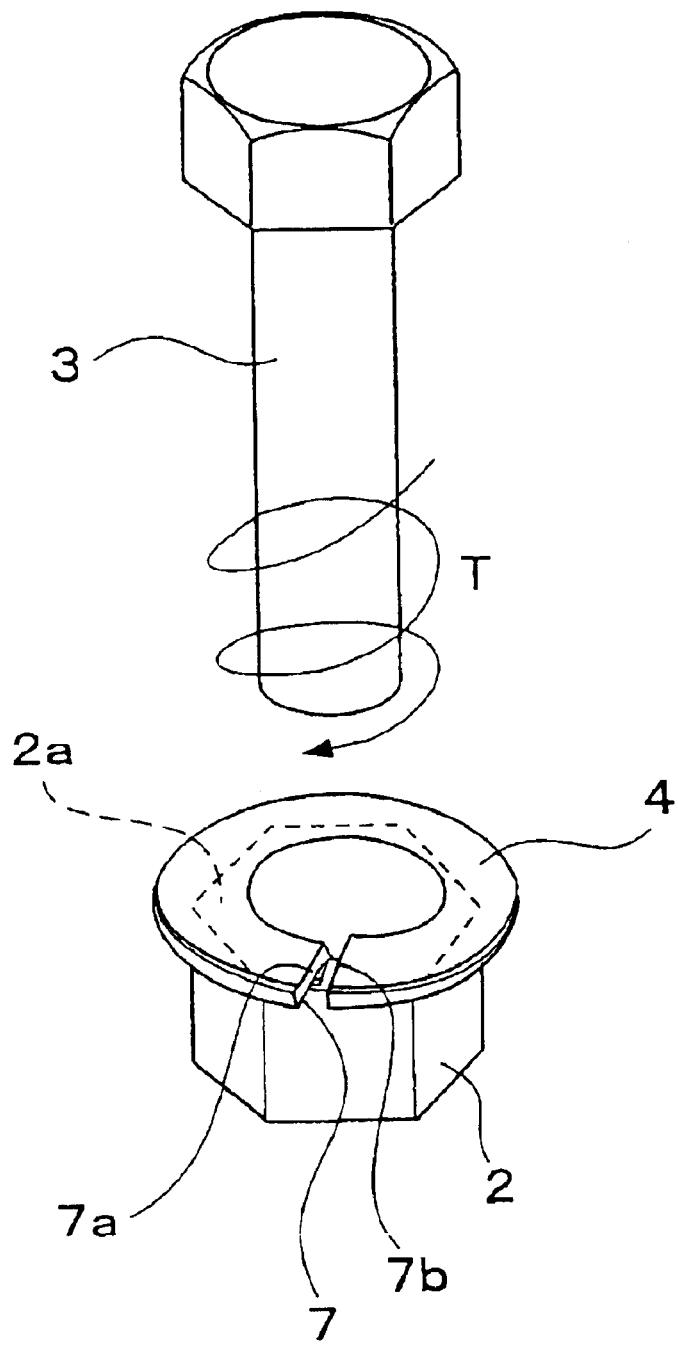
FIG. 8 is a perspective view for explaining a state where end portions of a slit for a notched circle of the washer are hooked to the nut by the fastening.

If the slit 7 for the notched circle of the washer 1 is inclined in the direction opposite to the spiral direction of the bolt 3 as shown in FIG. 8, a spiral fastening force T of the nut 2 is applied to the base portion 4 of the washer 1. Thus, an end portion 7a of the slit 7 for the notched circle locating on the front side in the spiral direction becomes a sharp edge shape for a fastening surface 2a of the nut 2. The edge-shaped end portion 7a of the slit 7 for the notched circle bites the fastening surface 2a of the nut 2 and enters a state where the fastening surface 2a is cut so as to stand and the end portion 7a is hooked.

Since the loosing direction of the spiral engagement of the bolt 3 and the nut 2 is opposite to the direction in which the fastening force T is applied, even if a vibration or the like is applied in such a direction as to loosen the spiral engagement of the bolt 3 and the nut 2, the portion where the end portion 7a of the slit 7 for the notched circle has been hooked to the fastening surface 2a of the nut 2 becomes a stopper and prevents the nut 2 from rotating in the loosing direction.

The height of conical barrel member 6 of the washer 1 is set to be lower than that of the conical hole portion 10. The inner flange-shaped jaggy portion 12 is provided between the conical hole portion 10 of the nut 2 and the female screw portion 11. Therefore, even if the conical barrel member 6 is extended by the fastening force of the nut 2, the edge of the conical barrel member 6 does not reach the female screw portion 11, and the screw portion 13 and the female screw portion 11 are not strongly crushed and damaged.

The washer 1 and the nut 2 which are assembled to the bolt 3 are not limited to a combination of a pair of them but a larger locking effect can be also obtained by using a plurality of combinations of the washers 1 and the nuts 2.

Although the example in which the washer 1 made of the soft material is used for the bolt 3 has been shown in the embodiment, the invention is not limited to such an example but the bolt 3 can be also made of the soft material for the washer 1 in a combination of the washer 1 and the bolt 3. In this case, the washer 1 made of a hard material presses the thread ridges of the bolt 3 made of the soft material. The inner peripheral surface of the conical barrel member 6 is bonded to the thread ridges with a pressure. The foregoing forces shown in FIG. 7 act on the washer 1. The large locking effect is realized owing to the strong integration of the bolt 3 and the nut 2 via the washer 1.

For example, a combination of a quenched alloy material having a martensite texture and an alloy material in a non-quenched state, or the like is considered as a hard material. If the washer 1 is formed by using the quenched alloy as a hard material, the diameter-decreased washer 1 is recovered to the original state by releasing the fastening force of the nut 2. Thus, the washer 1 can be repetitively used plural times without decreasing the locking effect.

The second embodiment of the washer 1 of the invention will now be described.

Figure 9:
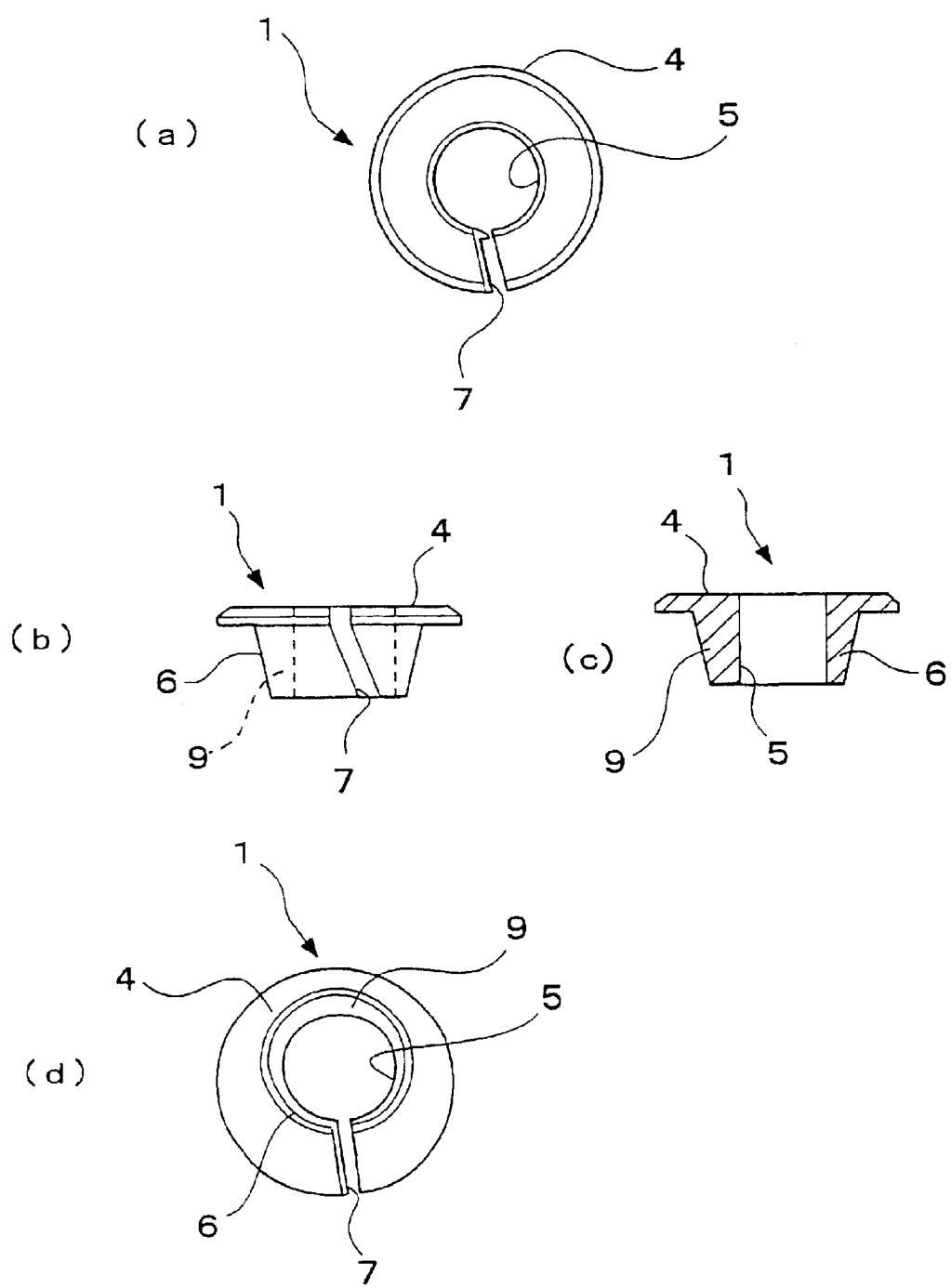
FIG. 9 shows the second embodiment of a washer according to the invention, in which (a) a plan view, (b) a side elevational view, (c) a vertical sectional view, and (d) a bottom view.

FIG. 9 shows the second embodiment of the washer 1 according to the invention, in which (a) a plan view, (b) a side elevational view, (c) a vertical sectional view, and (d) a bottom view.

As for the washer 1, a thick portion 9 which is slightly decentered for a center of a circle of the bolt through-hole 5 is provided for a part of the conical barrel member 6. As for the conical hole portion 10 of the nut 2 into which the conical barrel member 6 is fitted, an area of the inner flange-shaped jaggy portion 12 formed between the conical hole portion 10 and the female screw portion 11 increases.

Figure 10:
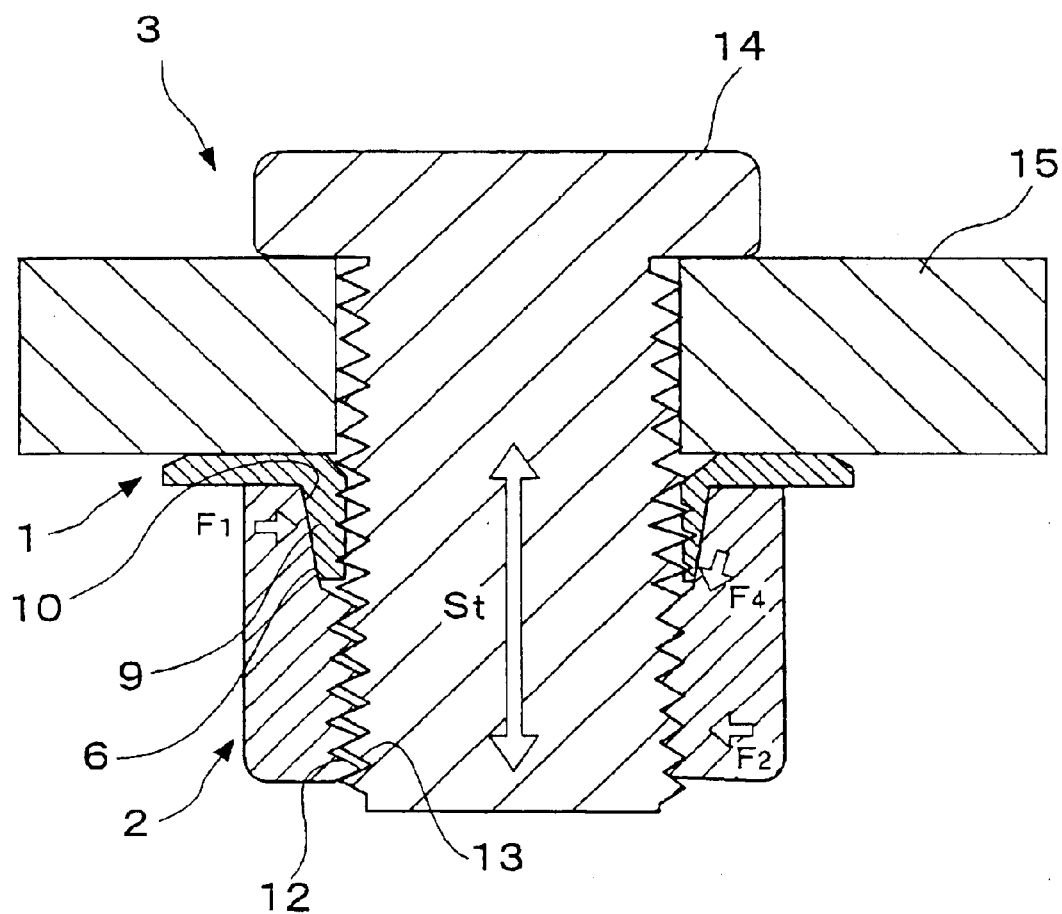
FIG. 10 is a vertical sectional view for explaining the direction in which a force is applied in a state where the fastener has been fastened by using the washer shown in FIG. 9.

FIG. 10 is a diagram for explaining the direction of the force showing the locking effect by the eccentric washer 1.

As shown in FIG. 10, the slightly eccentric thick portion 9 of the conical barrel member 6 fitted into the conical hole portion 10 presses (arrow F1) the bolt 3 from the radial direction. The bolt 3 which intends to enter a slightly inclined state by being pressed by the thick portion 9 is pressed (arrow F2) by the female screw portion 11 of the nut 2 from the radial direction opposite to the thick portion 9. Therefore, pressing forces (F1, F2) from the opposite radial directions are applied to the bolt 3 in upper and lower positions in the bolt axial direction, thereby providing the large locking effect.

Owing to the wedge-like effect such that the thick portion 9 of the conical barrel member 6 fitted into the conical hole portion 10 of the nut 2 presses the bolt 3 from the radial direction, a force (arrow F4) for allowing the screw portion 13 of the bolt to be come into pressure contact with the female screw portion 11 is applied from the whole circumference to the female screw portion 11 of the nut 2 which is in spiral engagement with the bolt at the front edge portion in the bolt axial direction rather than the washer 1. The frictional force which is applied to the thread ridges of both of the nut 2 and the bolt 3 are enhanced, thereby making the integration between the bolt 3 and the nut 2 strong.

Figure 11:
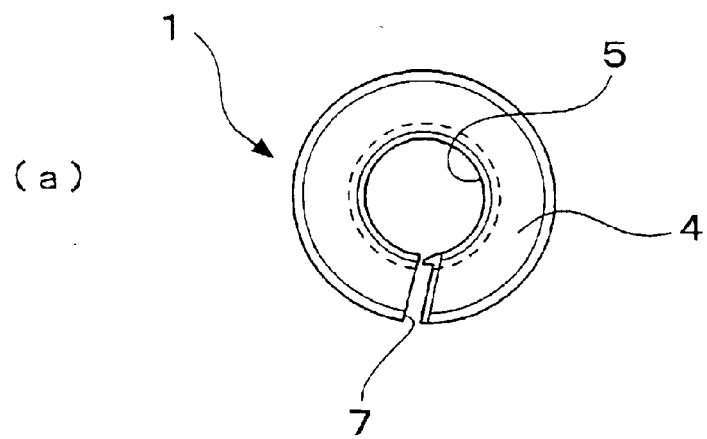
FIG. 11 shows the third embodiment of a washer according to the invention, in which (a) a plan view, (b) a side elevational view, and (c) a bottom view.
Figure 11:
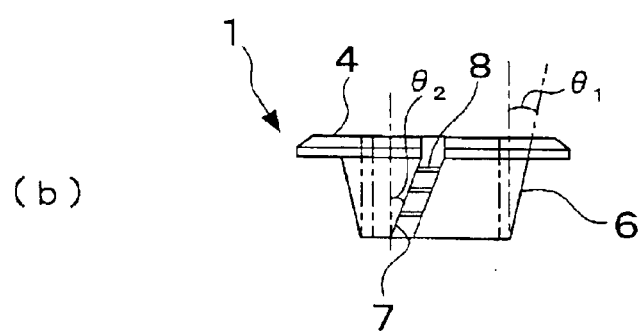
Figure 11:
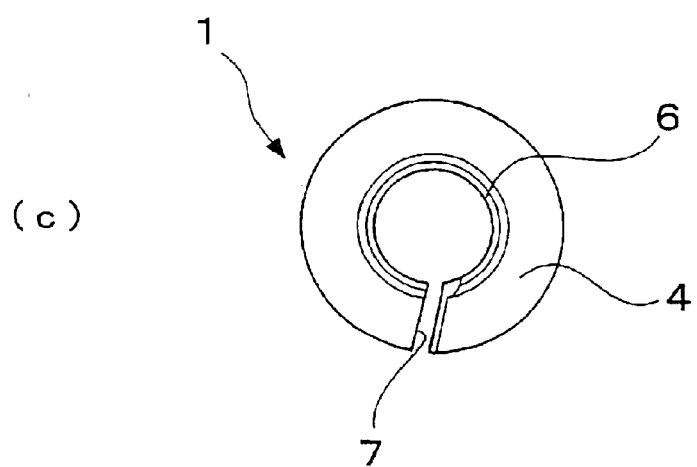

FIG. 11 shows the third embodiment of the washer 1, in which (a) a plan view, (b) a side elevational view, and (c) a bottom view.

As for the washer 1, a female screw 8 of the same pitch as that of the screw portion 13 of the bolt 3 is formed on the inner peripheral surface of the conical barrel member 6 by an amount of 2.5 to 3 leads. The slit 7 for the notched circle is inclined in the same direction as the spiral direction of the bolt 3.

If the female screw 8 of the same pitch as that of the screw portion 13 of the bolt 3 is formed on the inner peripheral surface of the conical barrel member 6, in association with the spiral engagement of the bolt 3 and the nut 2, the female screw 8 formed on the conical barrel member 6 is spirally fitted to the screw portion 13 of the bolt 3. The fastening force in the spiral direction is uniformly applied to the slit 7 for the notched circle inclined in the same direction as the spiral direction and the diameter of the whole conical barrel member 6 decreases uniformly, thereby enabling the conical barrel member 6 of the washer 1 to be smoothly fitted into the conical hole portion 10 of the nut 2. The fastening work can be easily performed.

Figure 12:
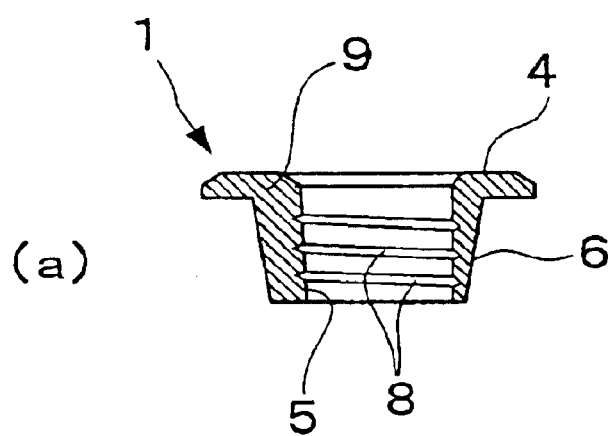
FIG. 12 shows the fourth embodiment of a washer according to the invention, in which (a) a vertical sectional view and (b) a bottom view.
Figure 12:
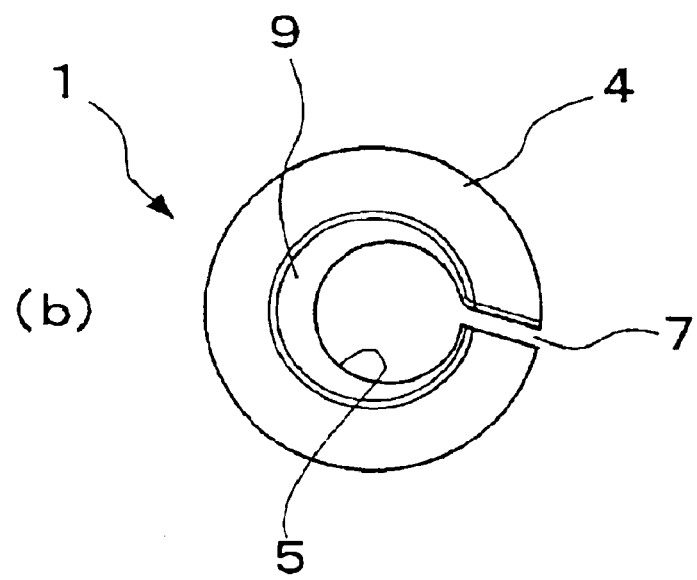

As shown in FIG. 12, as a fourth embodiment of the washer 1, the female screw 8 of the same pitch as that of the screw portion 13 of the bolt 3 can be also formed on the inner peripheral surface of the conical barrel member 6 having the slightly eccentric thick portion 9.

Figure 13:
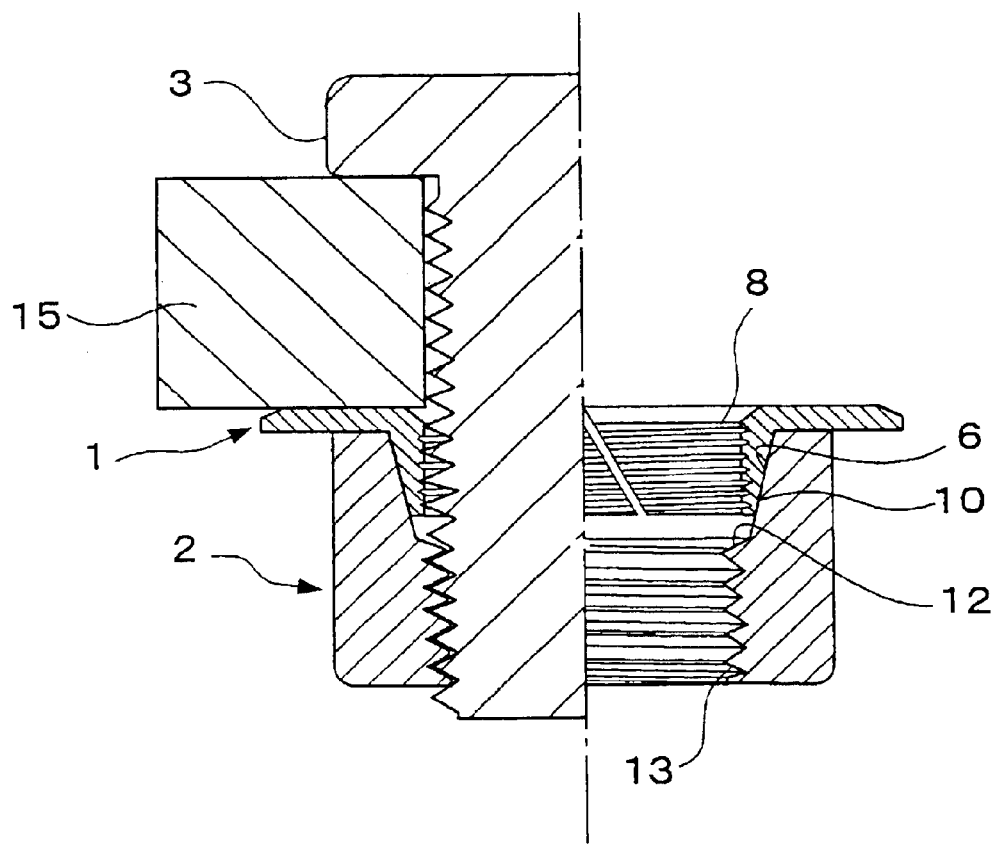
FIG. 13 shows the fifth embodiment of a washer according to the invention and is a semi vertical sectional view showing a state where a fastener has been fastened.

As a fifth embodiment of the washer 1 shown in FIG. 13, the screw 8 of a pitch which is finer than that of the screw portion 13 of the bolt 3 can be also formed on the inner peripheral surface of the conical barrel member 6 of the washer 1.

If the pitch of the screw 8 is set to be finer than that of the screw portion 13 of the bolt 3, only the front edge portion of the screw portion 13 is spirally come into engagement with the screw 8 of the washer 1. Therefore, the fastener can be easily loosed by using a tool such as a spanner or the like. It is convenient in the case where it is necessary to remove the fastener every predetermined period of time. The work such as a periodic inspection or the like can be easily performed.

The screw 8 of a pitch which is finer than that of the screw portion 13 of the bolt 3 can be also formed on the inner peripheral surface of the conical barrel member 6 of the washer 1 having the slightly eccentric thick portion 9.

Figure 14:
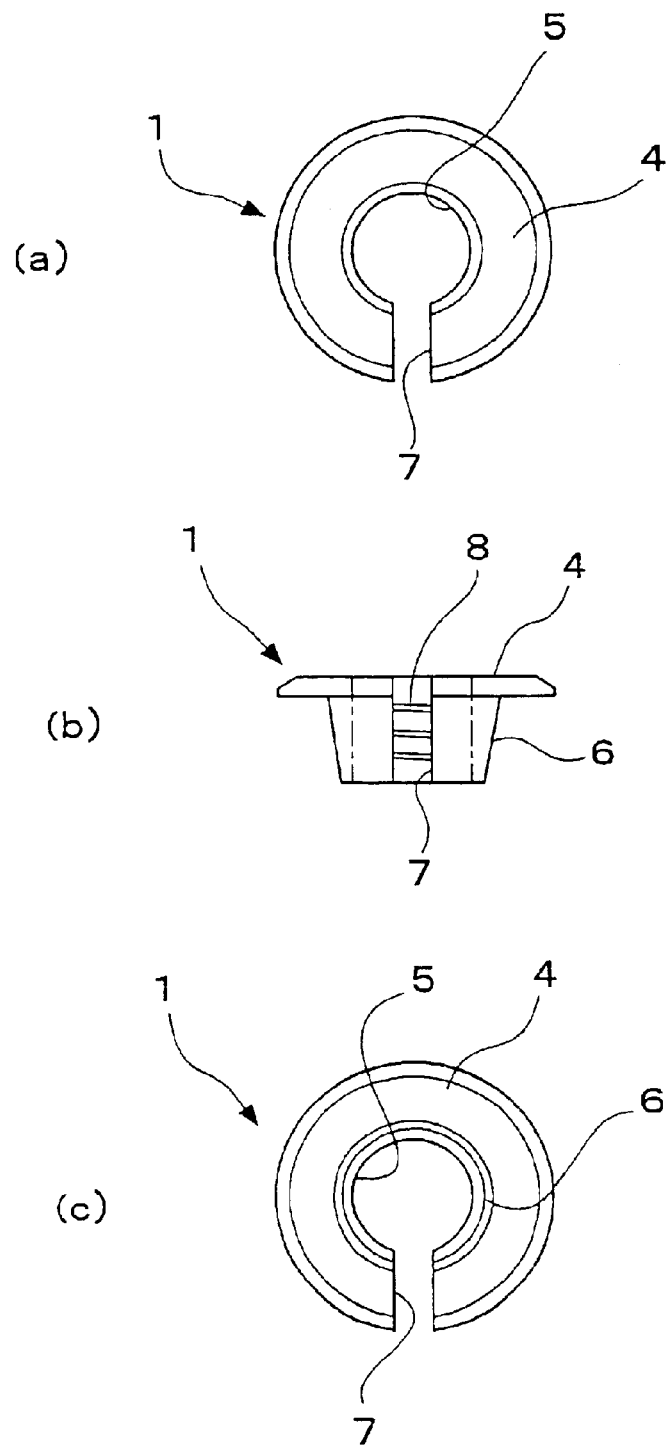
FIG. 14 shows the sixth embodiment of a washer according to the invention, in which (a) a plan view, (b) a side elevational view, and (c) a bottom view.

As shown in FIG. 14, as a sixth embodiment of the washer 1, the slit 7 for the notched circle of the washer 1 can be also formed in a straight shape in the same direction as the axial direction of the bolt 3.

Since the conical barrel member 6 of the washer 1 enters a state where it is forcedly pulled in the bolt axial direction by the fastening force of the nut 2 (refer to FIG. 7; arrow St), the end portion of the straight slit 7 for the notched circle becomes an edge shape for the fastening surface of the nut 2. The edge-shaped end portion of the slit 7 for the notched circle is hooked to the fastening surface of the nut 2. The portion to which the slit 7 for the notched circle has been hooked becomes a stopper, thereby preventing the nut 2 from being rotated in the loosing direction.

Figure 15:
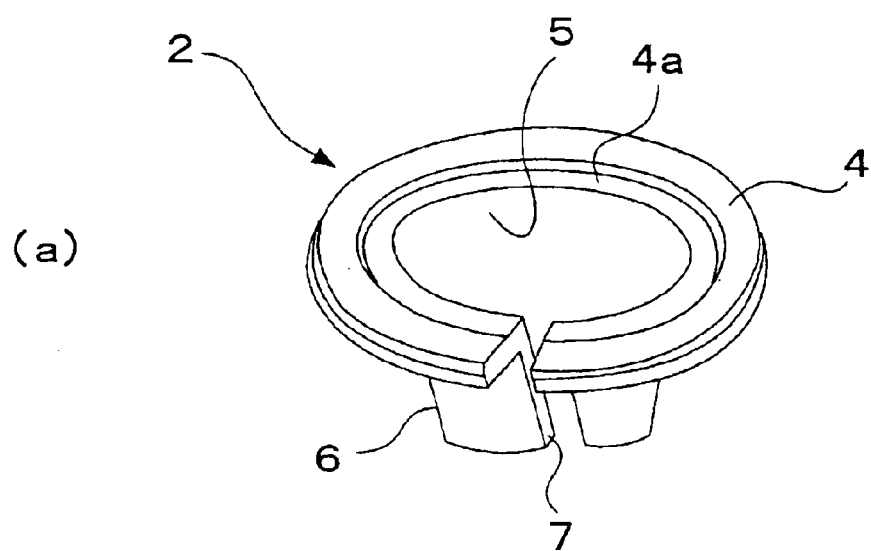
FIG. 15 shows the seventh embodiment of a washer according to the invention, in which (a) a perspective view and (b) a vertical sectional view.
Figure 15:
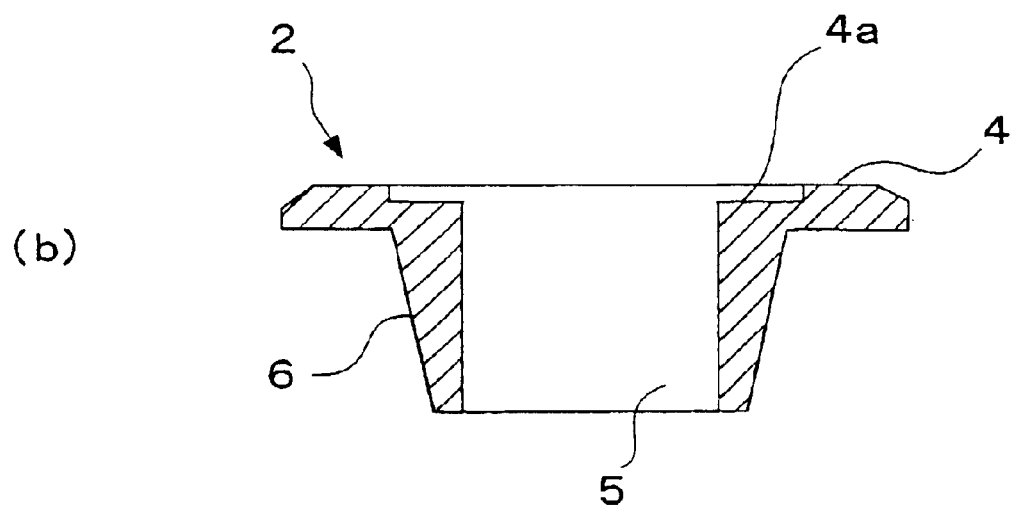

FIG. 15 shows the seventh embodiment of the washer 1. A concave portion 4a of a diameter which is slightly larger than that of the large diameter portion of the conical barrel member 6 is formed at the center of the base portion 4 of the washer 1.

Ordinarily, a diameter of female screw 11 of the nut 2 is set to be slightly larger than that of the screw portion 13 of the bolt 3 in order to solve machining errors. The nut 2 and the bolt 3 are fastened in a state where the bolt 3 is slightly inclined to the nut 2. There is a tendency such that the inclination of the bolt 3 to the nut 2 is larger as standard values of the nut 2 and the bolt 3 are larger. When the bolt 3 enters a state where it is slightly inclined, the pressure of the nut 2 onto the base portion 4 is not uniformly applied to the whole circumference of the base portion 4 of the washer 1 symmetrically with the bolt axis. Thus, the locking effect cannot be obtained.

Since the concave portion 4a is provided in the center portion of the base portion 4 of the washer 1, the pressure of the nut 2 onto the base portion 4 acts on the inner surface of the concave portion 4a. The base portion 4 remaining in the portion around the concave portion 4a is surface-uniformly come into contact with the plate to be fastened. Even in the case of a fastener of large standard values, the pressure of the nut 2 onto the base portion 4 acts uniformly on the whole circumference of the base portion 4 of the washer 1 symmetrically with the bolt axis, thereby making the integration of the nut 2 and the bolt 3 via the washer 1 strong.

When the bolt 3 and the nut 2 enlarge in size, although a plate thickness of the base portion 4 of the washer 1 which has been predetermined in accordance with the standard also increases naturally. However, a problem such that if the plate thickness of the base portion 4 increases, the fastening torque increases and the fastening work becomes difficult is caused.

If the concave portion 4a is provided for the base portion 4 of the washer 1, a gap is formed between the screw portion 13 of the bolt 3 and the base portion 4 of the washer 1 by the concave portion 4a. This results in a similar state where the base portion 4 of the washer 1 becomes thin in the portion around the screw portion 13 of the bolt 3, so that the fastening torque can be reduced. Inevitably, even in the case of a large fastener in which the base portion 4 of the washer 1 is thick, the fastening work can be easily performed.

Figure 16:
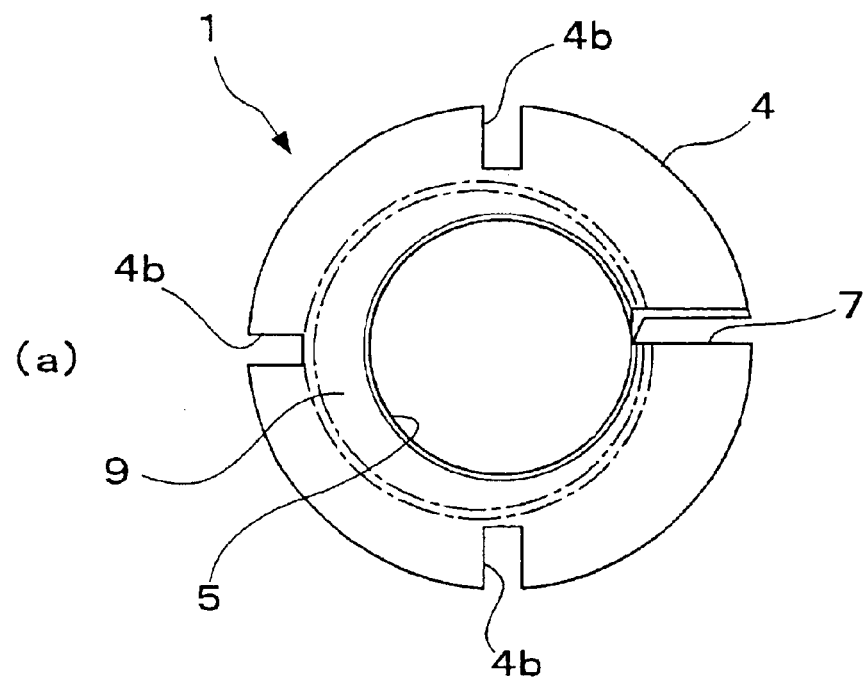
FIG. 16 shows the eighth embodiment of a washer according to the invention, in which (a) a plan view and (b) a bottom view.
Figure 16:
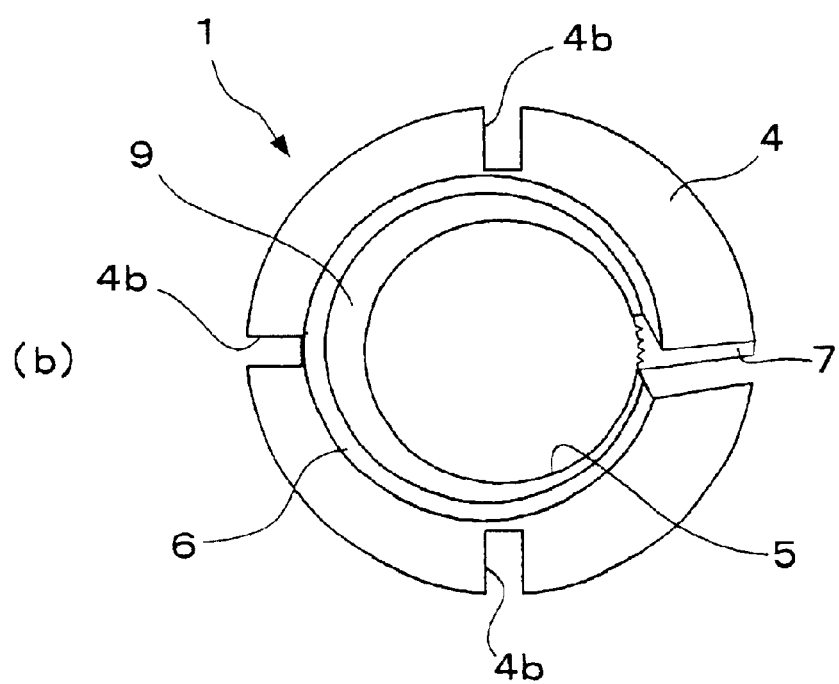

FIG. 16 shows the eighth embodiment of the washer 1, in which notched portions 4b obtained by cutting out the base portion 4 in the radial direction are formed in the base portion 4 of the washer 1.

By providing the notched portions 4b, a degree of freedom of deformation of the washer 1 increases for the fastening force of the nut 2, the conical barrel member 6 is easily bent and deformed in the diameter-decreasing direction, and the nut 2 can be easily fastened by a relatively weak force.

If the thick portion 9 is provided for the conical barrel member 6, by providing the notched portions 4b in the radial direction for the base portion 4 formed continuously with the thickest portion of the thick portion 9, a degree of freedom of deformation of, particularly, the portion which needs a force for rotation increases owing to the existence of the thick portion 9. Therefore, the fastening torque decreases and the fastening work can be easily performed.

Figure 17:
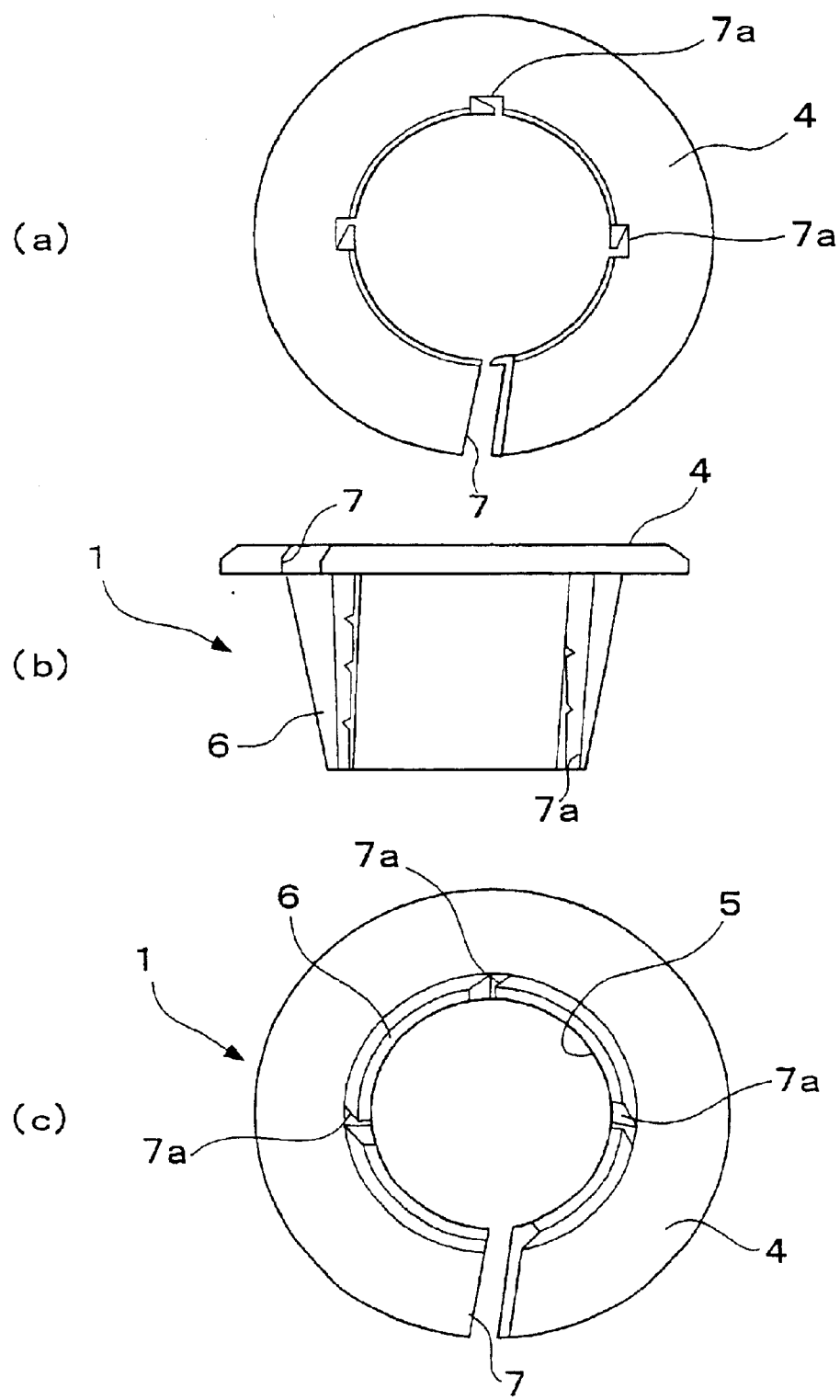
FIG. 17 shows the ninth embodiment of a washer according to the invention, in which (a) a plan view, (b) a side elevational view, and (c) a bottom view.

FIG. 17 shows the ninth embodiment of the washer 1. A plurality of vertical groove portions 7a are provided for the washer 1 in the axial direction of the conical barrel member 6. A degree of freedom of deformation of the conical barrel member 6 increases for the fastening force of the nut 2 by the vertical groove portions 7a, and the conical barrel member 6 is easily bent and deformed in the diameter-reducing direction. Thus, the fastening torque can be reduced.

Since a degree of freedom of deformation of the washer 1 increases by the vertical groove portions 7a, the rebound stress of the conical barrel member 6 in the bolt axis orthogonal direction is not attenuated but the strong integration of the bolt and the nut is maintained.

The vertical groove portions 7a can be also formed so as to be inclined in the same direction as the spiral direction of the screw portion 13 of the bolt 3 in a manner similar to the slit 7 for the notched circle.

If the vertical groove portions 7a are inclined in the same direction as the spiral direction of the screw portion 13, since the fastening force of the nut 2 which is spirally applied is uniformly applied to the vertical groove portions 7a, the diameter of the conical barrel member 6 decreases smoothly. The fastening work of the fastener can be further easily performed.

Figure 18:
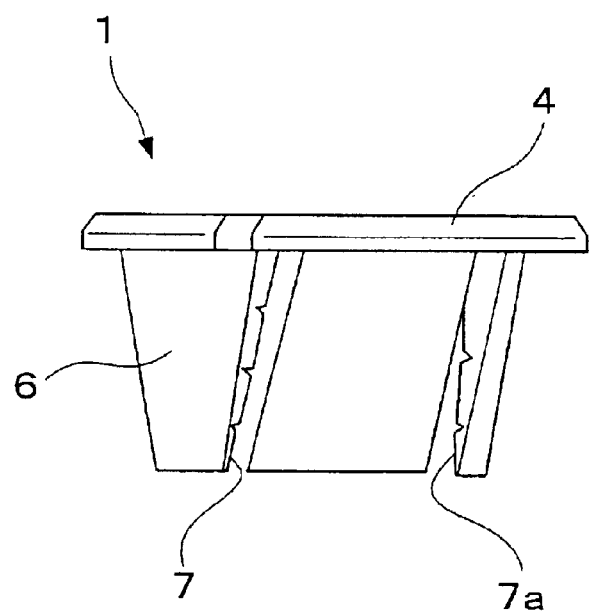
FIG. 18 shows the tenth embodiment of a washer according to the invention, in which (a) a side elevational view and (b) a bottom view.
Figure 18:
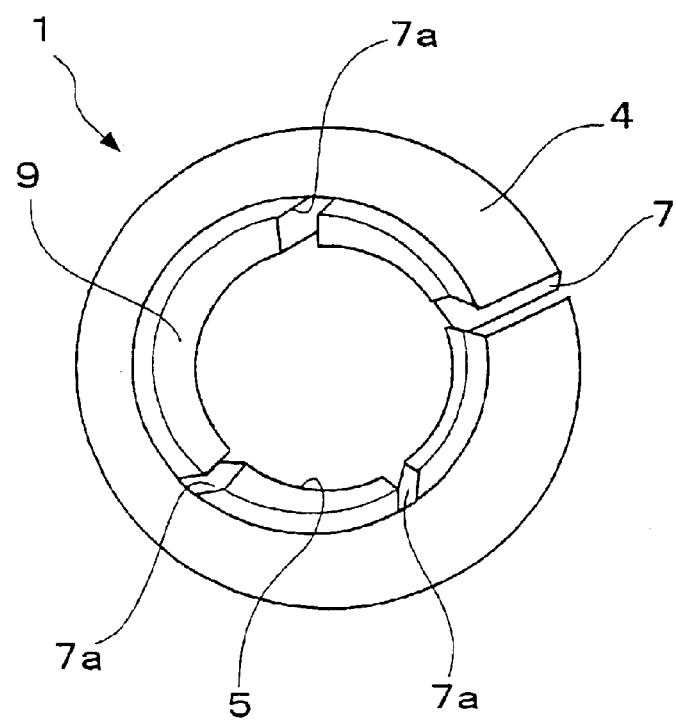

FIG. 18 shows the tenth embodiment of the washer 1. In the conical barrel member 6 having the slightly eccentric thick portion 9, by forming the vertical groove portions 7a or the slit 7 for the notched circle while avoiding the thickest portion of the thick portion 9, the pressure from the radial direction by the thick portion 9 can be made to act on the bolt 3. The pressing forces from the opposite radial directions are applied to the bolt 3 in upper and lower positions of the screw portion 13 of the bolt 3, thereby enabling the large locking effect to be obtained.

The vertical groove portions 7a or the slit 7 for the notched circle are not limited to the case where they are inclined in the same direction as the spiral direction of the screw portion 13, but they can be formed in various shapes such that they are formed in a straight shape, they are formed in a V-character shape, they are formed in a waveform shape, and the like.

Figure 19:
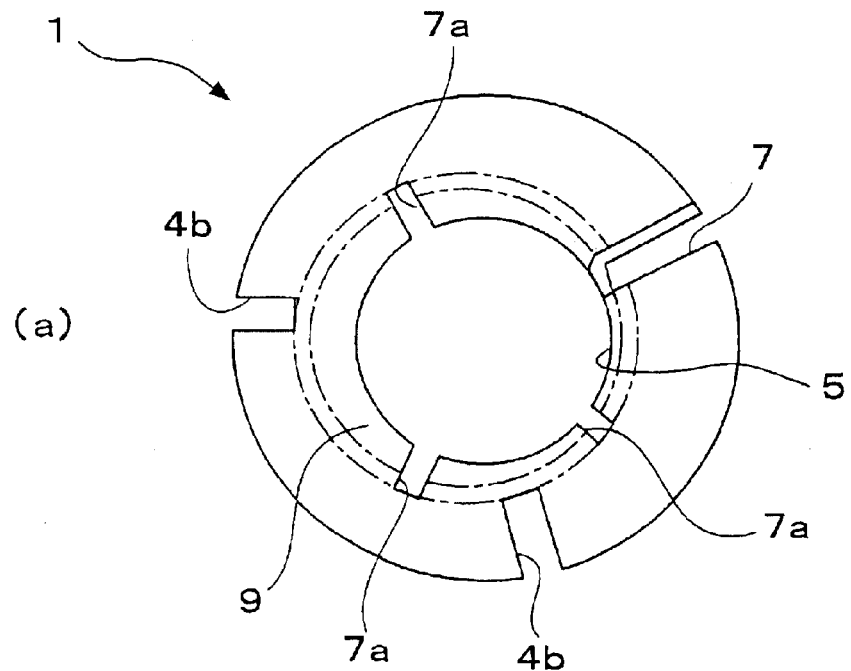
FIG. 19 shows the eleventh embodiment of a washer according to the invention, in which (a) a plan view and (b) a bottom view.
Figure 19:
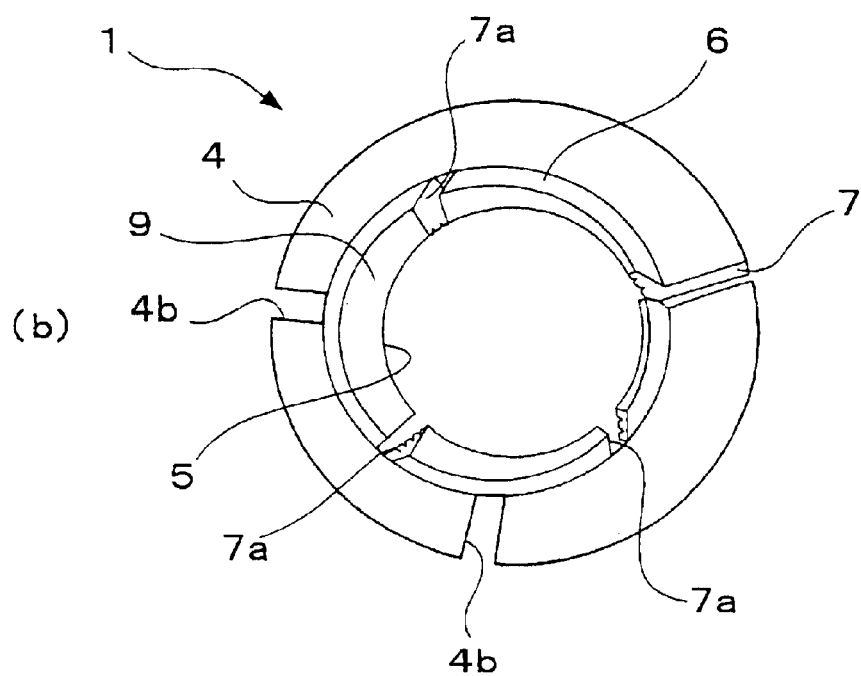

FIG. 19 shows the eleventh embodiment of the washer 1. Besides the slit 7 for the notched circle, both of the plurality of notched portions 4b formed in the base portion 4 and the plurality of vertical groove portions 7a formed on the conical barrel member 6 are provided for the washer 1.

In the washer 1 shown in FIG. 19, owing to the double effect of the notched portions 4b and the vertical groove portions 7a, the degree of freedom of deformation of the washer 1 increases, the conical barrel member 6 is easily bent and deformed, and its diameter decreases. Therefore, the fastening work can be easily performed and working efficiency is improved.

The fastener can be also made of a synthetic resin. For example, by making it by using FRP, the fastener of the invention can be used in a portion where strength, corrosion resistance, and the like are required. The fastener which provides the optimum locking effect of a proper material can be used in accordance with the use object, use location, or the like.

Figure 20:
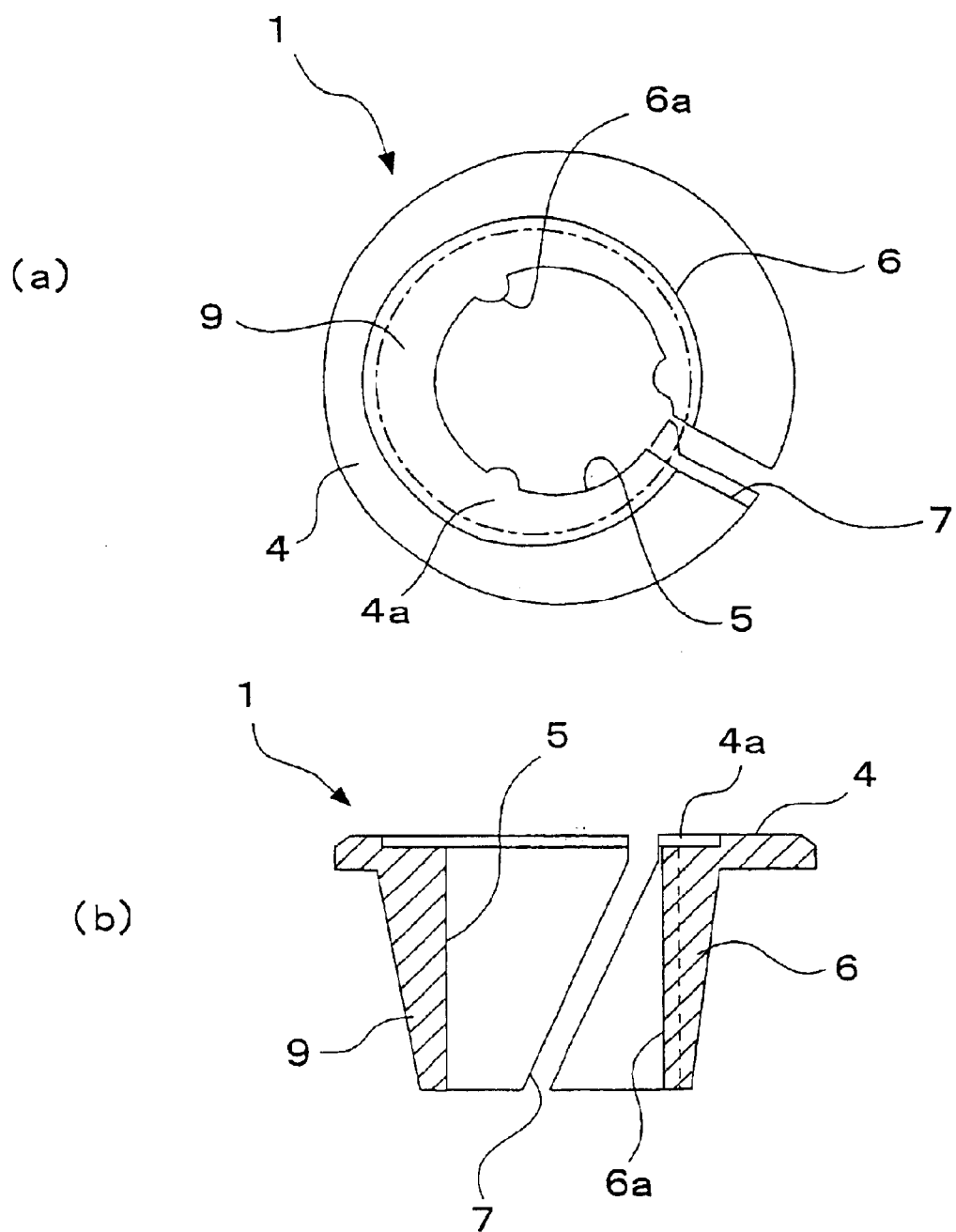
FIG. 20 shows the twelfth embodiment of a washer according to the invention, in which (a) a plan view and (b) a semi vertical sectional view.

FIG. 20 shows the twelfth embodiment of the washer 1. Three projecting portions 6a are formed on the whole area in the vertical direction of the inner peripheral surface of the conical barrel member 6 of the washer 1 made of a synthetic resin.

In the washer 1 made of the synthetic resin, since it is difficult to work precisely in terms of costs, the projecting portions 6a are formed on the inner peripheral surface of the conical barrel member 6. Since the thread ridges of the bolt 3 are bitten with the projecting portions 6a, a state where the conical barrel member 6 is certainly bitten and sandwiched between the nut 2 and the bolt 3 is obtained. Therefore, the foregoing forces adapted to strongly integrate the nut 2 and the bolt 3 are allowed to act on the washer 1 made of the synthetic resin and the large locking effect can be obtained.

As shown in FIG. 20(b), in the case of the washer which is used in the fastener of the large standard values, the concave portion 4a can be also provided for the base portion 4 of the washer 1 in a manner similar to the seventh embodiment shown in FIG. 16.

Figure 21:
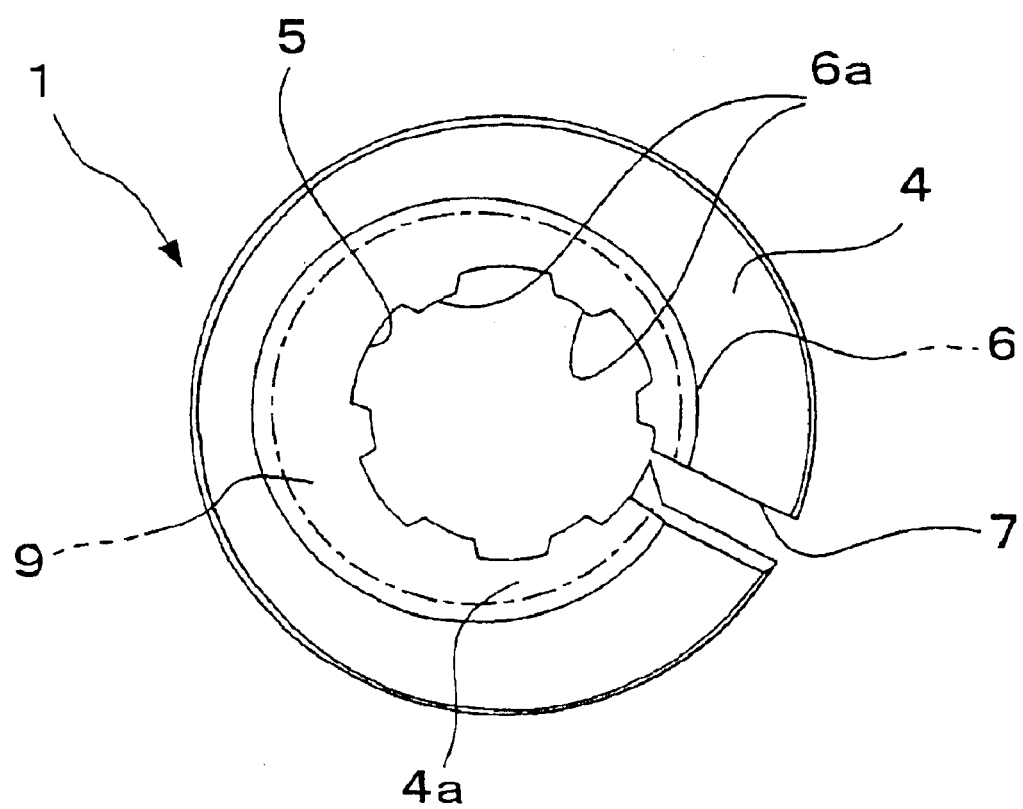
FIG. 21 shows the thirteenth embodiment of a washer according to the invention and is a plan view.
Figure 22:
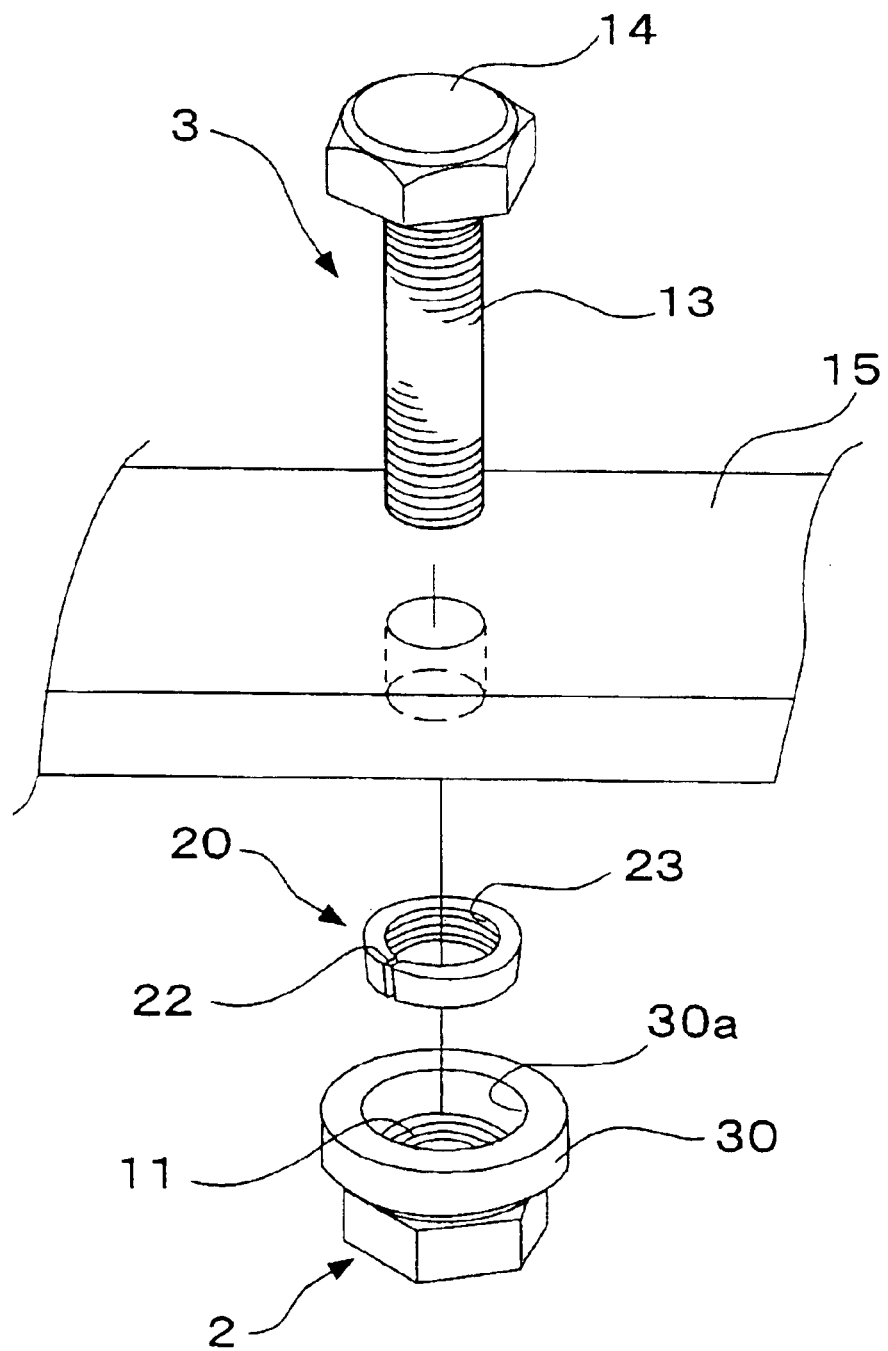
FIG. 22 shows a prior art and is a perspective view showing a bolt, a locking member, and a nut.

FIG. 21 shows the thirteenth embodiment of the washer 1. The projecting portions 6a which are formed on the inner peripheral surface of the conical barrel member 6 of the washer 1 are not limited to the three projecting portions as in the twelfth embodiment shown in FIG. 21, but a plurality of projecting portions 6a can be also provided at the same angle.

In FIGS. 20 and 21, the examples in which the projecting portions 6a are provided for the conical barrel member 6 having the thick portion 9 have been shown. However, the projecting portions 6a can be also provided on the inner peripheral surface of the conical barrel member 6 without the thick portion 9.

As described above, according to the invention, since the base portion 4 of the washer 1 and the conical barrel member 6 are interposed between the bolt 3 and the nut 2, the bolt 3 and the nut 2 are strongly integrated via the two kinds of integration routes in the bolt axis orthogonal direction and the bolt axial direction, thereby rationally realizing the large locking effect.

What is claimed is:

1. A locking fastener, comprising:
    a bolt;
    a washer in which a base portion has a bolt through-hole that is slightly larger than a nominal diameter of the bolt, a conical barrel member whose diameter decreases toward an upward position in a bolt axial direction is formed around said bolt through-hole so as to stand therefrom, and a continuous slit for a notched circle is formed in said base portion and said conical barrel member; and
    a nut in which a conical hole portion is formed over a female screw portion that is screwed with a screw portion of said bolt, said conical hole portion being constructed in a manner such that a diameter of an inner periphery of a half portion which does not face said washer is set to be smaller than that of an outer periphery of a front edge portion of said conical barrel member, a diameter of an opening of a half portion on the side which faces said washer is set to be smaller than that of an outer periphery of a root portion of said conical barrel member, a height is slightly higher than that of said conical barrel member of said washer, a tapered surface of a same inclination angle as that of said conical barrel member of said washer is formed, and a part of said conical barrel member of said washer is constructed as a thick portion which is slightly decentered from a center of a circle of said bolt through-hole.

2. The locking fastener according to claim 1, wherein the height of said conical barrel member of said washer is set to a height such that a female screw of a same pitch as that of said screw portion of said bolt can be formed by an amount of 2.5 leads or more.

3. The locking fastener according to claim 1, wherein in a combination of said washer and said bolt, one of them is made of a soft material which is softer than that of the other.

4. The locking fastener according to claim 1, wherein said slit for the notched circle of said washer is formed so as to be inclined in a direction opposite to a spiral direction of said screw portion of said bolt.

5. The locking fastener according to claim 1, wherein said slit for the notched circle of said washer is formed so as to be inclined in a same direction as a spiral direction of said screw portion of said bolt.

6. The locking fastener according to claim 1, wherein said slit for the notched circle of said washer is formed in a same direction as the bolt axial direction.

7. The locking fastener according to claim 1, wherein a concave portion whose diameter is slightly larger than that of a large diameter portion of said conical barrel member and whose height is smaller than a thickness of said base portion is provided for said base portion of said washer.

8. The locking fastener according to claim 7, wherein the inclination angle of said slit for the notched circle of said washer to the bolt axial direction is set to an angle within a range from almost 20° to almost 25°.

9. The locking fastener according to claim 1, wherein at least one notched portion obtained by cutting out said base portion in a radial direction is provided for said base portion of said washer.

10. The locking fastener according to claim 9, wherein a notched portion obtained by cutting out said base portion in a radial direction is provided for said base portion of said washer formed continuously with a thickest portion of the eccentric conical barrel member of said washer.

11. The locking fastener according to claim 9, wherein the inclination angle of said slit for the notched circle of said washer to the bolt axial direction is set to an angle within a range from almost 20' to almost 25°.

12. The locking fastener according to claim 1, wherein a notched portion obtained by cutting out said base portion in a radial direction is provided for said base portion of said washer formed continuously with a thickest portion of the eccentric conical barrel member of said washer.

13. The locking fastener according to claim 1, wherein at least one vertical groove portion is provided for said conical barrel member of said washer while excluding a thickest portion of said eccentric conical barrel member of said washer.

14. The locking fastener according to claim 1, wherein the inclination angle of said conical barrel member of said washer is set to almost 10°.

15. The locking fastener according to claim 1, wherein a width of said slit for the notched circle of said washer is set to a width having a gap in a state where said bolt and said nut have been fully fastened.

16. The locking fastener according to claim 1, wherein said washer or said nut is made of a synthetic resin.

17. The locking fastener according to claim 16, wherein a plurality of projecting portions which project inwardly are formed on the inner peripheral surface of said conical barrel member of said washer in a whole area in a vertical direction.

18. The locking fastener according to claim 1, wherein a screw adapted to be come into engagement with said screw portion of said bolt is formed on the inner peripheral surface of said conical barrel member of said washer.

19. The locking fastener according to claim 18, wherein a female screw of a same pitch as that of said screw portion of said bolt is formed on the inner peripheral surface of said conical barrel member of said washer.

20. The locking fastener according to claim 18, wherein a screw of a pitch smaller than that of said screw portion of said bolt is formed on the inner peripheral surface of said conical barrel member of said washer.

* * * * *